United States Patent
Lu

(10) Patent No.: US 11,599,449 B2
(45) Date of Patent: *Mar. 7, 2023

(54) FRAMEWORK FOR UI AUTOMATION BASED ON GRAPH RECOGNITION TECHNOLOGY AND RELATED METHODS

(71) Applicant: CITRIX SYSTEMS, INC., Fort Lauderdale, FL (US)

(72) Inventor: Kai Lu, NanJing/JiangSu (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 25 days.

This patent is subject to a terminal disclaimer.

(21) Appl. No.: 17/445,512

(22) Filed: Aug. 20, 2021

(65) Prior Publication Data
US 2022/0027259 A1    Jan. 27, 2022

Related U.S. Application Data

(63) Continuation of application No. 17/005,556, filed on Aug. 28, 2020, now Pat. No. 11,169,908, which is a
(Continued)

(51) Int. Cl.
*G06F 11/36* (2006.01)
*G06F 11/00* (2006.01)
(Continued)

(52) U.S. Cl.
CPC .......... *G06F 11/3664* (2013.01); *G06F 9/451* (2018.02); *G06F 11/3608* (2013.01);
(Continued)

(58) Field of Classification Search
CPC ............. G06F 11/3664; G06F 11/3608; G06F 11/3676; G06F 11/3688; G06F 11/2257;
(Continued)

(56) References Cited

U.S. PATENT DOCUMENTS 6,505,342 B1    1/2003   Hartmann et al.
7,979,849 B2    7/2011   Feldstein et al.
(Continued)

FOREIGN PATENT DOCUMENTS

CN    101102579    1/2008
CN    104965778    10/2015

OTHER PUBLICATIONS

Thomas D. White et al., Improving Random GUI Testing with Image-Based Widget Detection, Jul. 15-19, 2019, [Retrieved on Oct. 7, 2022], Retrieved from the internet: <URL: https://dl.acm.org/doi/pdf/10.1145/3293882.3330551> 11 Pages (307-317) (Year: 2019).*

(Continued)

*Primary Examiner* — Anibal Rivera

(57) ABSTRACT

A GUI testing device may be configured to execute a testing state machine for interacting with a software application to generate an initial screen of a GUI. The GUI testing device may be configured to determine a current state in the testing state machine based upon a matching trigger target in the initial screen to a given state. The current state may include an operation, and the operation may associate with a trigger target to operate on. The trigger may include a source state, a destination state, and a trigger target. The operation may include a user input operation, and an operation trigger target. The GUI testing device may be configured to perform the operation on the matching trigger target in the initial screen to generate a next screen of the GUI, and advance from the current state to a next state based upon the trigger.

20 Claims, 20 Drawing Sheets

Related U.S. Application Data continuation of application No. PCT/CN2020/104020, filed on Jul. 24, 2020.

(51) Int. Cl.

| | | |
|---|---|---|
| *G06F 9/451* | (2018.01) | |
| *G06N 3/08* | (2023.01) | |
| *G06N 3/04* | (2023.01) | |
| *G06F 3/14* | (2006.01) | |
| *G06F 11/34* | (2006.01) | |
| *G06F 11/30* | (2006.01) | |
| *G06F 11/22* | (2006.01) | |

(52) U.S. Cl.
CPC ...... *G06F 11/3676* (2013.01); *G06F 11/3688* (2013.01); *G06N 3/04* (2013.01); *G06N 3/08* (2013.01); *G06F 3/1454* (2013.01); *G06F 11/2257* (2013.01); *G06F 11/3072* (2013.01); *G06F 11/3447* (2013.01); *G06F 11/3684* (2013.01); *G06F 11/3692* (2013.01)

(58) Field of Classification Search
CPC ............ G06F 11/3072; G06F 11/3447; G06F 11/3684; G06F 11/3692; G06F 9/451; G06N 3/04; G06N 3/08; G06N 3/1454
See application file for complete search history.

(56) References Cited

U.S. PATENT DOCUMENTS

| | | |
|---|---|---|
| 10,747,651 B1 | 8/2020 | Vanderwall et al. |
| 10,902,705 B1 | 1/2021 | Rose |
| 10,904,259 B1 | 1/2021 | Rose |
| 10,977,155 B1 | 4/2021 | Muras et al. |
| 11,010,284 B1 | 5/2021 | Santiago et al. |
| 2002/0104039 A1 | 8/2002 | DeRolf et al. |
| 2008/0097984 A1 | 4/2008 | Candelore |
| 2008/0098432 A1 | 4/2008 | Hardacker et al. |
| 2010/0138775 A1 | 6/2010 | Kohen et al. |
| 2013/0339930 A1 | 12/2013 | Xu |
| 2016/0328312 A1 | 11/2016 | Loder et al. |
| 2018/0270301 A1 | 9/2018 | Zhang et al. |
| 2019/0266076 A1 | 8/2019 | Maliani et al. |
| 2020/0310517 A1* | 10/2020 | Li .......................... G06F 9/466 |
| 2020/0401382 A1 | 12/2020 | Briggs et al. |
| 2021/0174347 A1 | 6/2021 | Rose |

OTHER PUBLICATIONS

Blackburn et al. "Strategies for Web and GUI Testing" Apr. 2004, http://www.knowledgebytes.net/downloads/Strategies_Web_and_GUI_testing_spc-2004014-D-P.pdf; 23 Pages 00(1-23) (Year: 2004).
Ana Christina Ramada Paiva Pimenta "Automated Specification-Based Testing of Graphical User Interfaces" Nov. 2006, pp. 252 https://paginas.fe.up.pt/paiva/PhD/PhDGUITesting.pdf.

* cited by examiner

FRAMEWORK FOR UI AUTOMATION BASED ON GRAPH RECOGNITION TECHNOLOGY AND RELATED METHODS

RELATED APPLICATIONS

This application is a continuation of application Ser. No. 17/005,556 filed Aug. 28, 2021, now U.S. Pat. No. 11,169,908, which is a continuation of PCT application serial no. PCT/CN2020/104020 filed Jul. 24, 2020, which are hereby incorporated herein in their entirety by reference.

TECHNICAL FIELD

The present disclosure relates to software testing, and more particularly, to user interface (UI) testing and related devices, systems, and methods.

BACKGROUND

A consideration when designing software applications for computing devices is providing an easy to use graphical user interface (GUI). To aid in this effort, computing device operating system (OS) providers have developed testing framework applications for designers. The testing framework applications may provide an easy interface to test computing device applications, and perform multiple iterations of interactions with the software application under development.

SUMMARY

Generally, a computing system may include a GUI testing device in communication with a computing device configured to execute a software application with an associated GUI. The GUI testing device may be configured to execute a testing state machine for interacting with the software application to generate an initial screen of the GUI. The testing state machine may include a plurality of states. The GUI testing device may be configured to determine a current state in the testing state machine based upon a matching trigger target in the initial screen to a given state. The current state may include at least one operation, the at least one operation may be associated with at least one trigger target to operate on, and the at least one trigger. The at least one trigger may include a source state, a destination state, and a trigger target. The at least one operation may include a user input operation, and an operation trigger target. The GUI testing device may be configured to determine the current state in the testing state machine by at least applying a pre-trained convolutional neural network (CNN) to generate a plurality of labels, and finding the trigger including the matching trigger target in the plurality of labels. The matching trigger target may include a source state being the current state. The GUI testing device may be configured to perform the at least one operation on the matching trigger target in the initial screen to generate a next screen of the GUI, and advance from the current state to a next state based upon the at least one trigger.

More specifically, the GUI testing device may be configured to determine a plurality of GUI elements in the initial screen, and the matching trigger target may comprise a matching target GUI element from the plurality of GUI elements. In yet other different embodiments, the GUI testing device may be configured to determine the current state in the testing state machine by at least determining and applying a matching image template with the initial screen, and finding the trigger including the matching trigger target in the matching image template. The matching trigger target may include a source state being the current state.

Also, the GUI testing device may be configured to perform the at least one operation on the trigger target in a current screen to generate another screen of the GUI. The at least one operation may comprise a plurality thereof, and the trigger target may comprise a plurality thereof associated with the plurality of operations. The GUI testing device may be configured to iteratively perform each operation on the trigger target to generate a plurality of next screens of the GUI. The user input operation may comprise at least one of a keyboard input and a mouse input. For example, the GUI testing device may be configured to execute the testing state machine based upon a JavaScript object notation (JSON) file.

For example, the convolutional neural network comprises a pre-trained CNN. The GUI testing device may be configured to train the CNN based upon a screenshot of the GUI, and an annotation file associated with the screenshot of the GUI. The determining of the current state may comprise applying the CNN to generate a plurality of boxes associated with the plurality of labels, and a plurality of locations for the plurality of boxes.

Yet another aspect is directed to a method for operating a GUI testing device in communication with a computing device configured to execute a software application with an associated GUI. The method may include executing a testing state machine for interacting with the software application to generate an initial screen of the GUI. The testing state machine may comprise a plurality of states. The method also may include determining a current state in the testing state machine based upon a matching trigger target in the initial screen to a given state. The current state may comprise at least one operation, at least one trigger, and at least one trigger target associated with the at least one operation. The at least one trigger may include a source state, a destination state, and a trigger target. The at least one operation may include a user input operation, and an operation trigger target. The determining may include applying a pre-trained CNN to generate a plurality of labels, and a plurality of boxes associated with the plurality of labels, and finding the trigger including the matching trigger target in the plurality of labels, the matching trigger including a source state being the current state. The method may comprise performing the at least one operation on the matching trigger target in the initial screen to generate a next screen of the GUI, and advancing from the current state to a next state based upon the at least one trigger.

DETAILED DESCRIPTION

Figure 1:
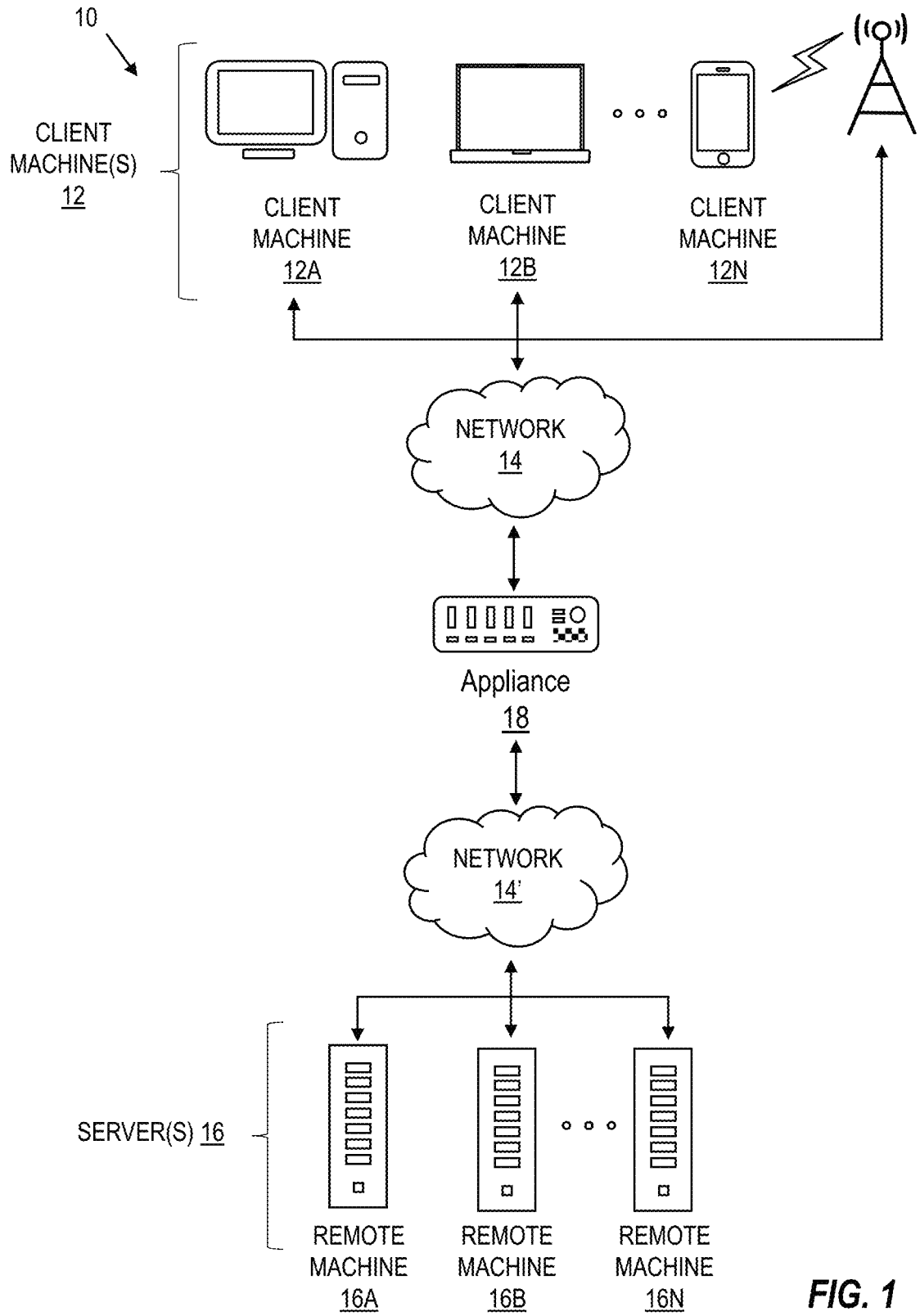
FIG. 1 is a schematic block diagram of a network environment of computing devices in which various aspects of the disclosure may be implemented.

Referring initially to FIG. 1, a non-limiting network environment 10 in which various aspects of the disclosure may be implemented includes one or more client machines 12A-12N, one or more remote machines 16A-16N, one or more networks 14, 14', and one or more appliances 18 installed within the computing environment 10. The client machines 12A-12N communicate with the remote machines 16A-16N via the networks 14, 14'.

In some embodiments, the client machines 12A-12N communicate with the remote machines 16A-16N via an intermediary appliance 18. The illustrated appliance 18 is positioned between the networks 14, 14' and may also be referred to as a network interface or gateway. In some embodiments, the appliance 108 may operate as an application delivery controller (ADC) to provide clients with access to business applications and other data deployed in a data center, the cloud, or delivered as Software as a Service (SaaS) across a range of client devices, and/or provide other functionality such as load balancing, etc. In some embodiments, multiple appliances 18 may be used, and the appliance(s) 18 may be deployed as part of the network 14 and/or 14'.

The client machines 12A-12N may be generally referred to as client machines 12, local machines 12, clients 12, client nodes 12, client computers 12, client devices 12, computing devices 12, endpoints 12, or endpoint nodes 12. The remote machines 16A-16N may be generally referred to as servers 16 or a server farm 16. In some embodiments, a client device 12 may have the capacity to function as both a client node seeking access to resources provided by a server 16 and as a server 16 providing access to hosted resources for other client devices 12A-12N. The networks 14, 14' may be generally referred to as a network 14. The networks 14 may be configured in any combination of wired and wireless networks.

A server 16 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 16 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; an HTTP client; a FTP client; an Oscar client; a Telnet client; or any other set of executable instructions.

In some embodiments, a server 16 may execute a remote presentation services program or other program that uses a thin-client or a remote-display protocol to capture display output generated by an application executing on a server 16 and transmit the application display output to a client device 12.

In yet other embodiments, a server 16 may execute a virtual machine providing, to a user of a client device 12, access to a computing environment. The client device 12 may be a virtual machine. The virtual machine may be managed by, for example, a hypervisor, a virtual machine manager (VMM), or any other hardware virtualization technique within the server 16.

In some embodiments, the network 14 may be: a local-area network (LAN); a metropolitan area network (MAN); a wide area network (WAN); a primary public network 14; and a primary private network 14. Additional embodiments may include a network 14 of mobile telephone networks that use various protocols to communicate among mobile devices. For short range communications within a wireless local-area network (WLAN), the protocols may include 802.11, Bluetooth, and Near Field Communication (NFC).

Figure 2:
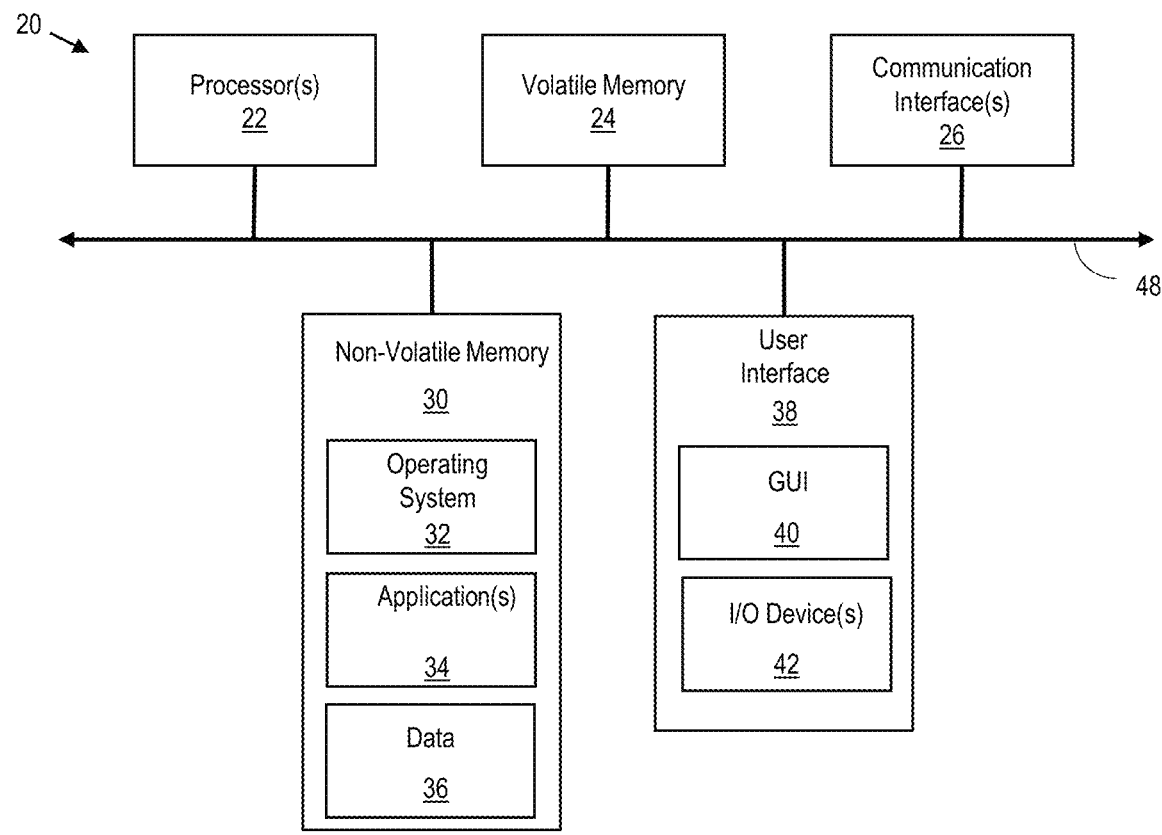
FIG. 2 is a schematic block diagram of a computing device useful for practicing an embodiment of the client machines or the remote machines illustrated in FIG. 1.

FIG. 2 depicts a block diagram of a computing device 20 useful for practicing an embodiment of client devices 12, appliances 18 and/or servers 16. The computing device 20 includes one or more processors 22, volatile memory 24 (e.g., random access memory (RAM)), non-volatile memory 30, user interface (UI) 38, one or more communications interfaces 26, and a communications bus 48.

The non-volatile memory 30 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 38 may include a GUI 40 (e.g., a touchscreen, a display, etc.) and one or more input/output (I/O) devices 42 (e.g., a mouse, a keyboard, a microphone, one or more speakers, one or more cameras, one or more biometric scanners, one or more environmental sensors, and one or more accelerometers, etc.).

The non-volatile memory 30 stores an operating system 32, one or more applications 34, and data 36 such that, for example, computer instructions of the operating system 32 and/or the applications 34 are executed by processor(s) 22 out of the volatile memory 24. In some embodiments, the volatile memory 24 may include one or more types of RAM and/or a cache memory that may offer a faster response time than a main memory. Data may be entered using an input device of the GUI 40 or received from the I/O device(s) 42. Various elements of the computer 20 may communicate via the communications bus 48.

The illustrated computing device 20 is shown merely as an example client device or server, and may be implemented by any computing or processing environment with any type of machine or set of machines that may have suitable hardware and/or software capable of operating as described herein.

The processor(s) 22 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 22 may be analog, digital or mixed-signal. In some embodiments, the processor 22 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 26 may include one or more interfaces to enable the computing device 20 to access a computer network such as a Local Area Network (LAN), a Wide Area Network (WAN), a Personal Area Network (PAN), or the Internet through a variety of wired and/or wireless connections, including cellular connections.

In described embodiments, the computing device 20 may execute an application on behalf of a user of a client device. For example, the computing device 20 may execute one or more virtual machines managed by a hypervisor. Each virtual machine may provide an execution session within which applications execute on behalf of a user or a client device, such as a hosted desktop session. The computing device 20 may also execute a terminal services session to provide a hosted desktop environment. The computing device 20 may provide access to a remote computing environment including one or more applications, one or more desktop applications, and one or more desktop sessions in which one or more applications may execute.

An example virtualization server 16 may be implemented using Citrix Hypervisor provided by Citrix Systems, Inc., of Fort Lauderdale, Fla. ("Citrix Systems"). Virtual app and desktop sessions may further be provided by Citrix Virtual Apps and Desktops (CVAD), also from Citrix Systems. Citrix Virtual Apps and Desktops is an application virtualization solution that enhances productivity with universal access to virtual sessions including virtual app, desktop, and data sessions from any device, plus the option to implement a scalable VDI solution. Virtual sessions may further include Software as a Service (SaaS) and Desktop as a Service (DaaS) sessions, for example.

Figure 3:
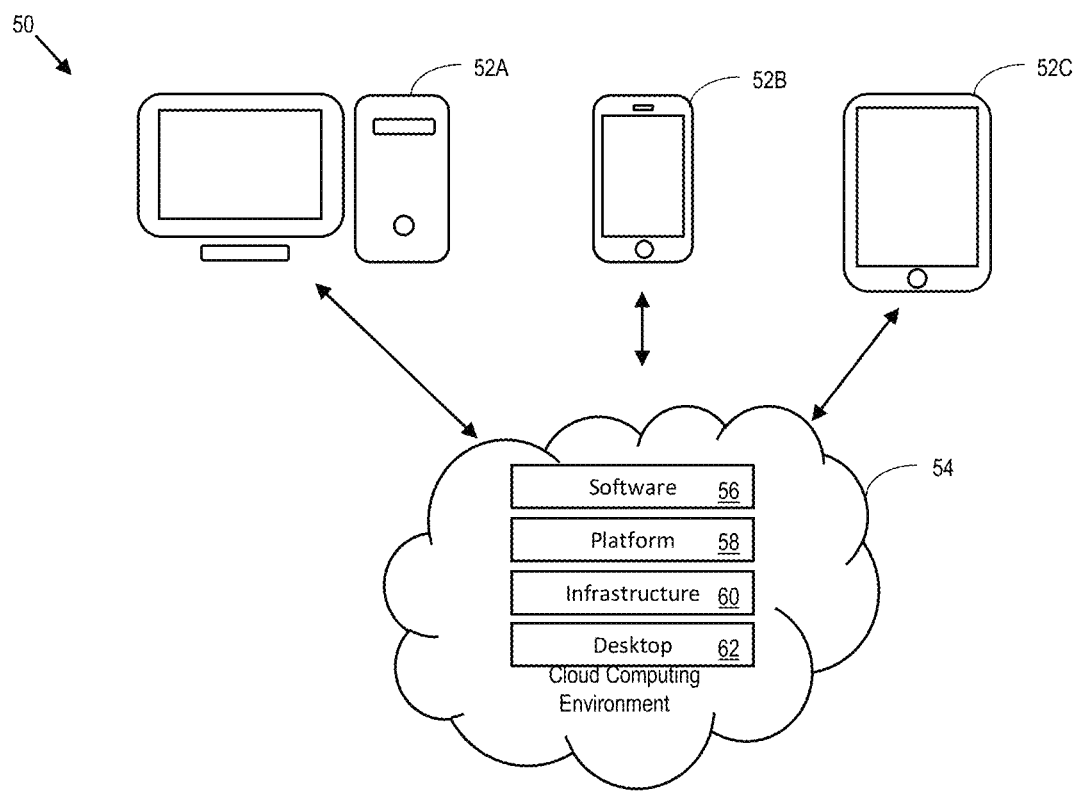
FIG. 3 is a schematic block diagram of a cloud computing environment in which various aspects of the disclosure may be implemented.

Referring to FIG. 3, a cloud computing environment 50 is depicted, which may also be referred to as a cloud environment, cloud computing or cloud network. The cloud computing environment 50 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 50, one or more clients 52A-52C (such as those described above) are in communication with a cloud network 54. The cloud network 54 may include backend platforms, e.g., servers, storage, server farms or data centers. The users or clients 52A-52C can correspond to a single organization/tenant or multiple organizations/tenants. More particularly, in one example implementation the cloud computing environment 50 may provide a private cloud serving a single organization (e.g., enterprise cloud). In another example, the cloud computing environment 50 may provide a community or public cloud serving multiple organizations/tenants. In still further embodiments, the cloud computing environment 50 may provide a hybrid cloud that is a combination of a public cloud and a private cloud. Public clouds may include public servers that are maintained by third parties to the clients 52A-52C or the enterprise/tenant. The servers may be located off-site in remote geographical locations or otherwise.

The cloud computing environment 50 can provide resource pooling to serve multiple users via clients 52A-52C through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 50 can provide on-demand self-service to unilaterally provision computing capabilities (e.g., server time, network storage) across a network for multiple clients 52A-52C. The cloud computing environment 50 can provide an elasticity to dynamically scale out or scale in responsive to different demands from one or more clients 52. In some embodiments, the computing environment 50 can include or provide monitoring services to monitor, control and/or generate reports corresponding to the provided shared services and resources.

In some embodiments, the cloud computing environment 50 may provide cloud-based delivery of different types of cloud computing services, such as Software as a service (SaaS) 56, Platform as a Service (PaaS) 58, Infrastructure as a Service (IaaS) 60, and Desktop as a Service (DaaS) 62, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

Figure 4:
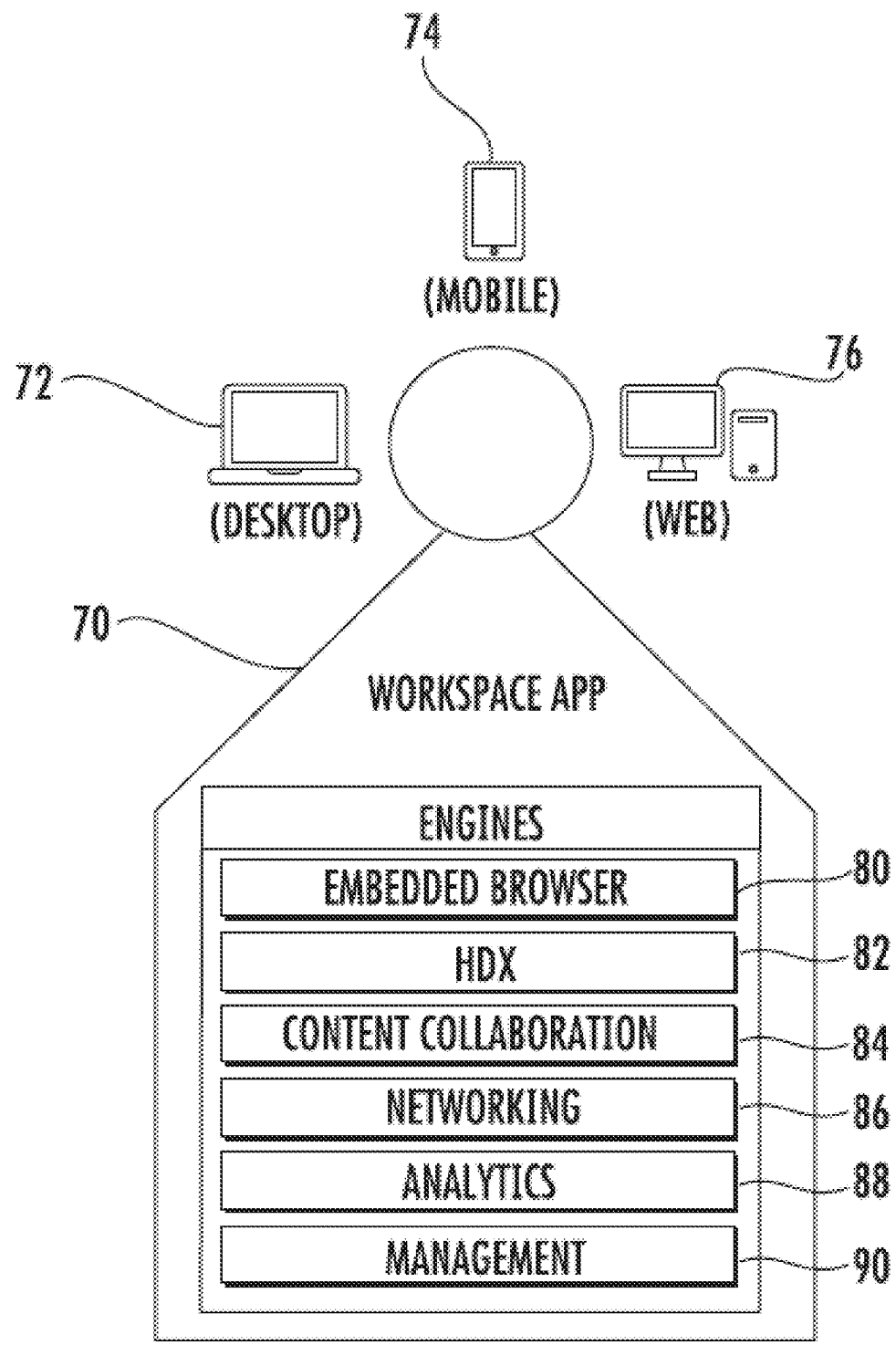
FIG. 4 is a schematic block diagram of desktop, mobile and web based devices operating a workspace app in which various aspects of the disclosure may be implemented.

The unified experience provided by the Citrix Workspace app will now be discussed in greater detail with reference to FIG. 4. The Citrix Workspace app will be generally referred to herein as the workspace app 70. The workspace app 70 is how a user gets access to their workspace resources, one category of which is applications. These applications can be SaaS apps, web apps or virtual apps. The workspace app 70 also gives users access to their desktops, which may be a local desktop or a virtual desktop. Further, the workspace app 70 gives users access to their files and data, which may be stored in numerous repositories. The files and data may be hosted on Citrix ShareFile, hosted on an on-premises network file server, or hosted in some other cloud storage provider, such as Microsoft OneDrive or Google Drive Box, for example.

To provide a unified experience, all of the resources a user requires may be located and accessible from the workspace app 70. The workspace app 70 is provided in different versions. One version of the workspace app 70 is an installed application for desktops 72, which may be based on Windows, Mac or Linux platforms. A second version of the workspace app 70 is an installed application for mobile devices 74, which may be based on iOS or Android platforms. A third version of the workspace app 70 uses a hypertext markup language (HTML) browser to provide a user access to their workspace environment. The web version of the workspace app 70 is used when a user does not want to install the workspace app or does not have the rights to install the workspace app, such as when operating a public kiosk 76.

Each of these different versions of the workspace app 70 may advantageously provide the same user experience. This advantageously allows a user to move from client device 72 to client device 74 to client device 76 in different platforms and still receive the same user experience for their workspace. The client devices 72, 74 and 76 are referred to as endpoints.

As noted above, the workspace app 70 supports Windows, Mac, Linux, iOS, and Android platforms as well as platforms with an HTML browser (HTML5). The workspace app 70 incorporates multiple engines 80-90 allowing users access to numerous types of app and data resources. Each engine 80-90 optimizes the user experience for a particular resource. Each engine 80-90 also provides an organization or enterprise with insights into user activities and potential security threats.

An embedded browser engine 80 keeps SaaS and web apps contained within the workspace app 70 instead of launching them on a locally installed and unmanaged browser. With the embedded browser, the workspace app 70 is able to intercept user-selected hyperlinks in SaaS and web apps and request a risk analysis before approving, denying, or isolating access.

An Citrix High Definition User Experience (HDX) engine 82 establishes connections to virtual browsers, virtual apps and desktop sessions running on either Windows or Linux operating systems. With the HDX engine 82, Windows and Linux resources run remotely, while the display remains local, on the endpoint. To provide the best possible user experience, the HDX engine 82 utilizes different virtual channels to adapt to changing network conditions and application requirements. To overcome high-latency or high-packet loss networks, the HDX engine 82 automatically implements optimized transport protocols and greater compression algorithms. Each algorithm is optimized for a certain type of display, such as video, images, or text. The HDX engine 82 identifies these types of resources in an application and applies the most appropriate algorithm to that section of the screen.

For many users, a workspace centers on data. A content collaboration engine 84 allows users to integrate all data into the workspace, whether that data lives on-premises or in the cloud. The content collaboration engine 84 allows administrators and users to create a set of connectors to corporate and user-specific data storage locations. This can include OneDrive, Dropbox, and on-premises network file shares, for example. Users can maintain files in multiple repositories and allow the workspace app 70 to consolidate them into a single, personalized library.

A networking engine 86 identifies whether or not an endpoint or an app on the endpoint requires network connectivity to a secured backend resource. The networking engine 86 can automatically establish a full VPN tunnel for the entire endpoint device, or it can create an app-specific p-VPN connection. A p-VPN defines what backend resources an application and an endpoint device can access, thus protecting the backend infrastructure. In many instances, certain user activities benefit from unique network-based optimizations. If the user requests a file copy, the workspace app 70 can automatically utilize multiple network connections simultaneously to complete the activity faster. If the user initiates a VoIP call, the workspace app 70 improves its quality by duplicating the call across multiple network connections. The networking engine 86 uses only the packets that arrive first.

An analytics engine 88 reports on the user's device, location and behavior, where cloud-based services identify any potential anomalies that might be the result of a stolen device, a hacked identity or a user who is preparing to leave the company. The information gathered by the analytics engine 88 protects company assets by automatically implementing counter-measures.

A management engine 90 keeps the workspace app 70 current. This not only provides users with the latest capabilities, but also includes extra security enhancements. The workspace app 70 includes an auto-update service that routinely checks and automatically deploys updates based on customizable policies.

Figure 5:
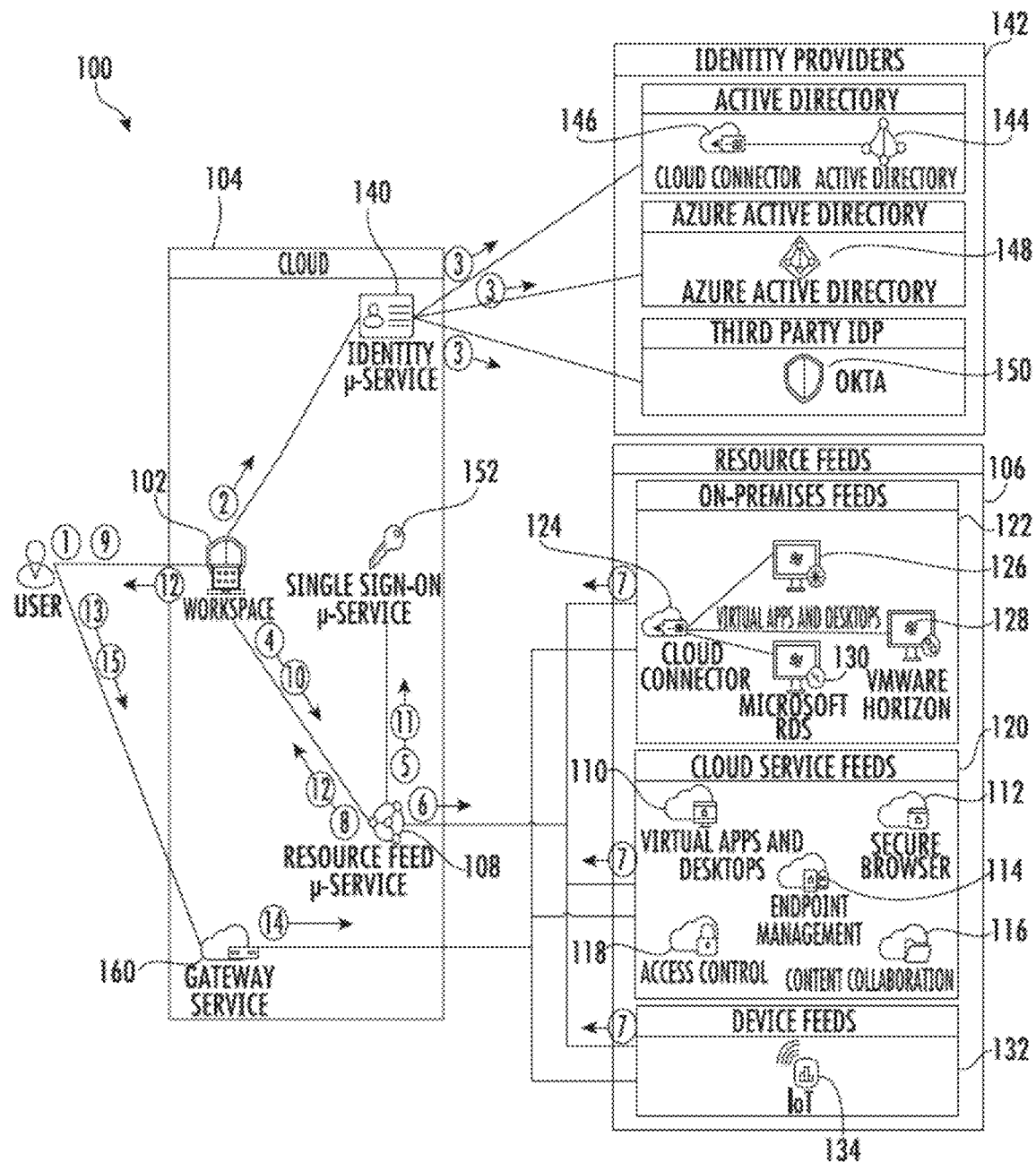
FIG. 5 is a schematic block diagram of a workspace network environment of computing devices in which various aspects of the disclosure may be implemented.

Referring now to FIG. 5, a workspace network environment 100 providing a unified experience to a user based on the workspace app 70 will be discussed. The desktop, mobile and web versions of the workspace app 70 all communicate with the workspace experience service 102 running within the Citrix Cloud 104. The workspace experience service 102 then pulls in all the different resource feeds 16 via a resource feed micro-service 108. That is, all the different resources from other services running in the Citrix Cloud 104 are pulled in by the resource feed micro-service 108. The different services may include a virtual apps and desktop service 110, a secure browser service 112, an endpoint management service 114, a content collaboration service 116, and an access control service 118. Any service that an organization or enterprise subscribes to are automatically pulled into the workspace experience service 102 and delivered to the user's workspace app 70.

In addition to cloud feeds 120, the resource feed micro-service 108 can pull in on-premises feeds 122. A cloud connector 124 is used to provide virtual apps and desktop deployments that are running in an on-premises data center. Desktop virtualization may be provided by Citrix virtual apps and desktops 126, Microsoft RDS 128 or VMware Horizon 130, for example. In addition to cloud feeds 120 and on-premises feeds 122, device feeds 132 from Internet of Thing (IoT) devices 134, for example, may be pulled in by the resource feed micro-service 108. Site aggregation is used to tie the different resources into the user's overall workspace experience.

The cloud feeds 120, on-premises feeds 122 and device feeds 132 each provides the user's workspace experience with a different and unique type of application. The workspace experience can support local apps, SaaS apps, virtual apps, and desktops browser apps, as well as storage apps. As the feeds continue to increase and expand, the workspace experience is able to include additional resources in the user's overall workspace. This means a user will be able to get to every single application that they need access to.

Still referring to the workspace network environment 20, a series of events will be described on how a unified experience is provided to a user. The unified experience starts with the user using the workspace app 70 to connect to the workspace experience service 102 running within the Citrix Cloud 104, and presenting their identity (event 1). The identity includes a user name and password, for example.

The workspace experience service 102 forwards the user's identity to an identity micro-service 140 within the Citrix Cloud 104 (event 2). The identity micro-service 140 authenticates the user to the correct identity provider 142 (event 3) based on the organization's workspace configuration. Authentication may be based on an on-premises active directory 144 that requires the deployment of a cloud connector 146. Authentication may also be based on Azure Active Directory 148 or even a third party identity provider 150, such as Citrix ADC or Okta, for example.

Once authorized, the workspace experience service 102 requests a list of authorized resources (event 4) from the resource feed micro-service 108. For each configured resource feed 106, the resource feed micro-service 108 requests an identity token (event 5) from the single-sign micro-service 152.

The resource feed specific identity token is passed to each resource's point of authentication (event 6). On-premises resources 122 are contacted through the Citrix Cloud Connector 124. Each resource feed 106 replies with a list of resources authorized for the respective identity (event 7).

The resource feed micro-service 108 aggregates all items from the different resource feeds 106 and forwards (event 8) to the workspace experience service 102. The user selects a resource from the workspace experience service 102 (event 9).

The workspace experience service 102 forwards the request to the resource feed micro-service 108 (event 10). The resource feed micro-service 108 requests an identity token from the single sign-on micro-service 152 (event 11). The user's identity token is sent to the workspace experience service 102 (event 12) where a launch ticket is generated and sent to the user.

The user initiates a secure session to a gateway service 160 and presents the launch ticket (event 13). The gateway service 160 initiates a secure session to the appropriate resource feed 106 and presents the identity token to seamlessly authenticate the user (event 14). Once the session initializes, the user is able to utilize the resource (event 15). Having an entire workspace delivered through a single access point or application advantageously improves productivity and streamlines common workflows for the user.

Typically, a UI automation mechanism may comprise using system UI application programming interfaces (APIs), such as Windows UIAutomation APIs, Web DOM APIs, iOS Automation instruments tools, or self-customized interface, etc., to detect a target (graph element), and then to do operations, such as a mouse click, a key input, or a multi-touch, on the target. The mechanism typically needs developers to generate some programming code, such as for implementing an interface or an element tag to support system automation APIs. This programming code is only used for UI automation, and increases the workload of developers. This mechanism is restricted by a third party library, which does not support UI automation, such as embedded web, React Library, or other cross-platform UI libraries. With the development of graph recognition technology based on deep learning, UI automation can use this technology to detect a target in the UI, such as a button, an icon, or a text box, instead of using traditional programing API to get graph elements.

The present disclosure includes a framework of UI automation based on graph recognition technology to simplify UI automation across all platforms (i.e. an OS agnostic approach). The framework recognizes graph elements based on computer vision (i.e. as if the machine views the screen just like a human does in UI testing). Helpfully, the user (i.e. an automation engineer) does not need to grasp specific UI automation programming skills for specific platform. The test procedure is same in this framework for all platforms.

Figure 6:
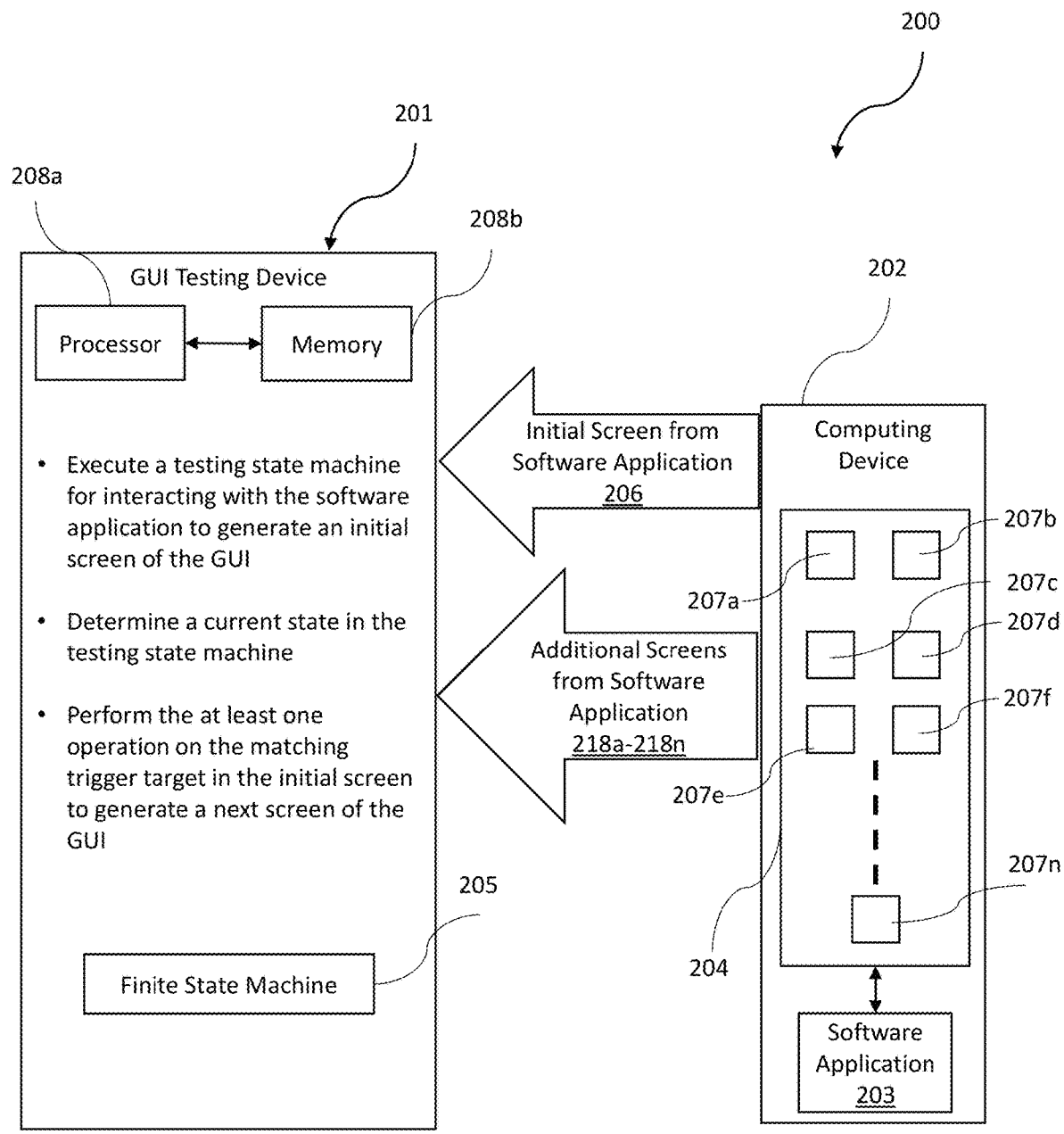
FIG. 6 is a schematic block diagram of a computing system, according to the present disclosure.

Referring now to FIG. 6, a computing system 200 according to the present disclosure is now described. The computing system 200 illustratively includes a GUI testing device 201, and a computing device 202 (e.g. mobile device) in communication (e.g. a wired or wireless LAN or Internet connection) with the GUI testing device. The GUI testing device 201 is configured to execute a software application 203 with an associated GUI 204. For example, the software application 203 may comprise a native/local software application, or a cloud based virtualized desktop application, as described hereinabove.

The GUI testing device 201 is configured to execute a testing state machine 205 for interacting with the software application 203 to generate an initial screen 206 (i.e. a screenshot) of the GUI. More specifically, the GUI testing device 201 is configured to determine a plurality of GUI elements 207a-207n in the initial screen 206. The GUI testing device 201 illustratively comprises a processor 208a and memory 208b cooperating therewith.

Figure 7:
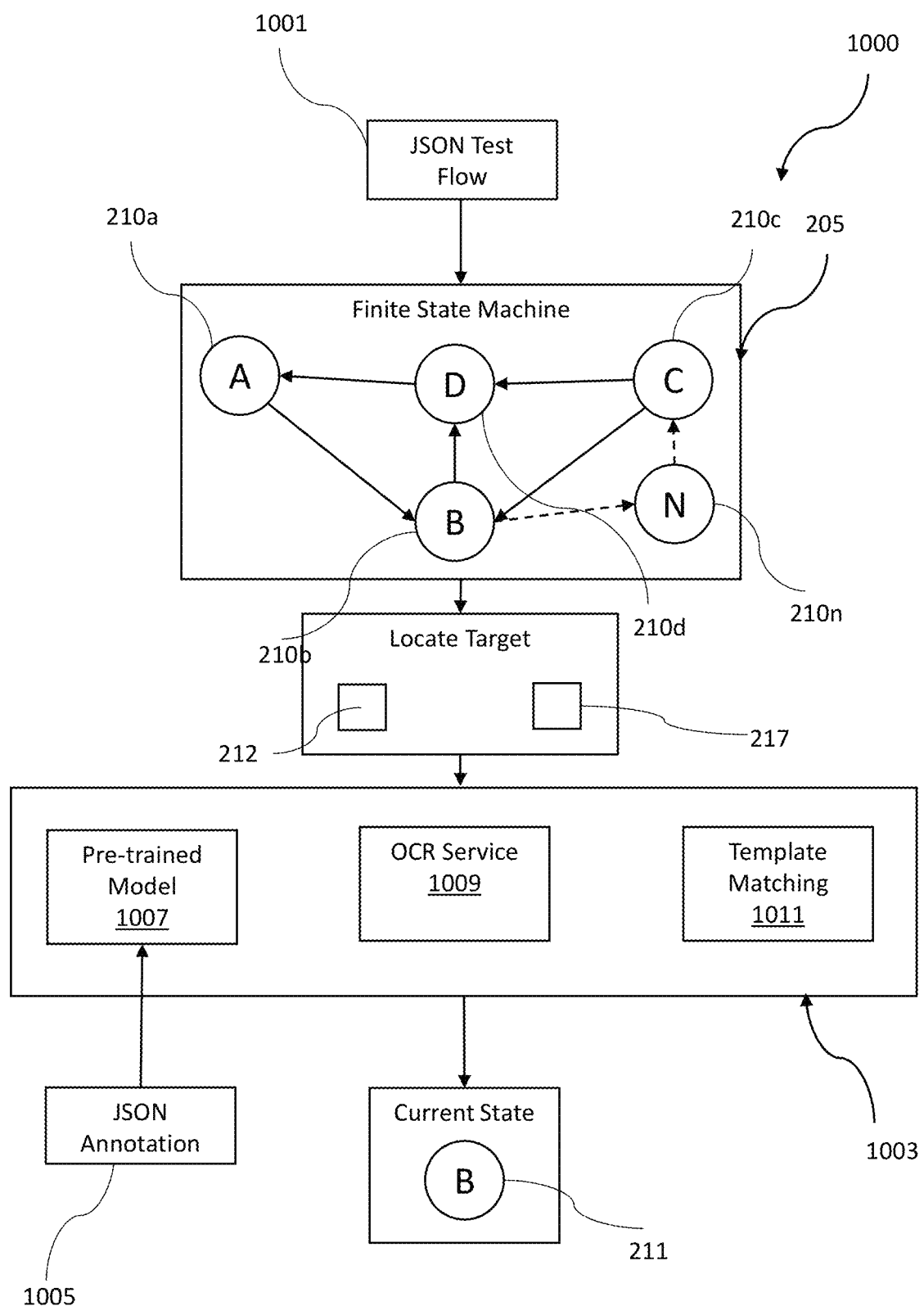
FIG. 7 is a schematic diagram of an architecture within an example embodiment of the computing system of FIG. 6.
Figure 8:
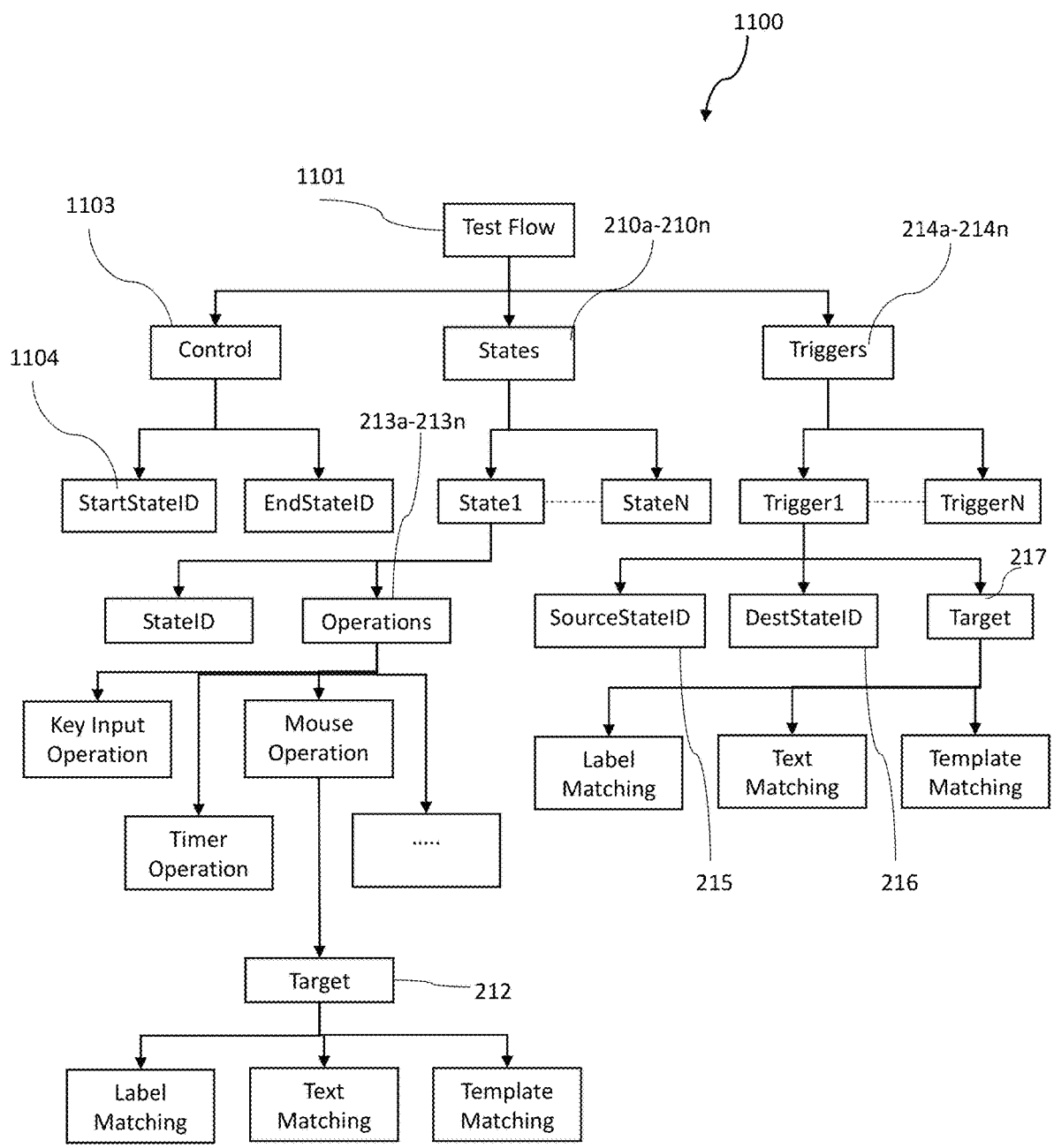
FIG. 8 is a schematic diagram of a test flow structure within the example embodiment of the computing system of FIG. 6.

Referring now additionally to FIGS. 7 and 8, the testing state machine 205 illustratively includes a plurality of states 210a-210n. For example, in some embodiments, the GUI testing device 201 may be configured to execute the testing state machine 205 based upon ingesting a JSON file.

The GUI testing device 201 is configured to determine a current state 211 in the testing state machine 205 based upon a StartStateID 1104 being determined as the state in the initial screen 206. The current state 211 includes a plurality of operations 213a-213n. Each operation 213a-213n may comprise a user input operation, and an operation trigger target 212. For a given operation 213a-213n, the user input operation is performed on the operation trigger target 212. The user input operation may comprise a mouse click, or a keyboard input, for example.

Each trigger 214a-214n includes a source state 215, a destination state 216, and a trigger target 217. In other words, each trigger 214a-214n provides a mapped transition between states 210a-210n within the testing state machine 205, and the testing state machine 205 includes the plurality of states 210a-210n with the plurality of triggers 214a-214n coupled therebetween. The trigger 214a-214n with a matching trigger target 217 includes a source state 215 being the current state 211 (i.e. finding triggers associated with the current state according to the source state on the testing state machine 205).

The GUI testing device 201 is configured to perform a respective operation 213a-213n on the matching trigger target in the initial screen 206 to generate a next screen 218a-218n of the GUI 204, and advance from the current state 211 to a next state based upon the respective trigger 214a-214n. More specifically, the matching trigger target comprises a matching target GUI element from the plurality of GUI elements 207a-207n, thereby locating a trigger 214a-214n in which the SourceStateID 215 is the current state 211 on the initial screen 206 where the plurality of operations 213a-213n is performed.

The GUI testing device 201 is configured to iteratively perform each operation 213a-213n on the trigger target 212 to generate a plurality of next screens 218a-218n of the GUI 204. In other words, the GUI testing device 201 is configured to work through each potential permutation of the initial screen 206 by performing multiple operations on the operation trigger target 212 in a current screen to generate another screen of the GUI 204. Indeed, the GUI testing device 201 performs these operations on each GUI element 207a-207n on the initial screen 206 to cover all permutations or to traverse each path from the current state 211 in the testing state machine 205.

In some embodiments, the GUI testing device 201 is configured to locate the trigger target 217 or the operation trigger target 212 from the current state 211 in the testing state machine 205 by at least performing OCR on the initial screen 206 to generate a plurality of text strings, and a plurality of boxes associated with the plurality of text strings, and finding the matching trigger target (i.e. trigger target 217 or the operation trigger target 212) in the plurality of text strings. Also, as shown in FIGS. 11-15, the GUI testing device 201 is configured to determine the next state in the triggers 214a-214n to transition from the current state 211 in the testing state machine by at least merging adjacent text strings in the plurality of text strings. In essence, the GUI testing device 201 is performing a text string search in the plurality of triggers 214a-214n in which the trigger target 217 includes matching text to find the matched trigger in which SourceStateID 215 is the current state 211 using the output of the OCR process. In addition, the GUI testing device 201 is performing a text string search in the plurality of operations 213a-213n in which operation trigger target 212 includes matching text to find the matched target to operate on in the current state 211 using the output of the OCR process.

In other embodiments, the GUI testing device 201 is configured to locate the trigger target 217 or the operation trigger target 212 from the current state 211 in the testing state machine 205 by at least applying a pre-trained CNN to generate a plurality of labels, and a plurality of boxes associated with the plurality of labels. The GUI testing device 201 is configured to find the matching trigger target (i.e. either trigger target 217 or the operation trigger target 212) in the plurality of labels. Again, the GUI testing device 201 is performing a text string search through the plurality of labels strings to find the matched trigger which SourceStateID 215 is the current state 211, but the GUI elements 207a-207n are here discovered using machine learning rather than the OCR process. In addition, the GUI testing device 201 is performing a text string search through the plurality of labels strings to find the matched operation trigger target 212 in operations of the current state 211, but the GUI elements 207a-207n are here discovered using machine learning rather than the OCR process.

In yet other different embodiments, the GUI testing device 201 is configured to locate the trigger target 217 or the operation trigger target 212 from the current state 211 in the testing state machine 205 by at least determining and applying a matching image template with the initial screen 206. The GUI testing device 201 is configured to find the matching trigger target (i.e. either trigger target 217 or the operation trigger target 212) in the matching image template. In short, the GUI testing device 201 is matching images of GUI elements 207a-207n in the initial screen 206 with a known library of GUI element images (i.e. a GUI element lineup of sorts). In some applications, the GUI testing device 201 is configured to use one or more of the GUI element discovery techniques (i.e. a combination of OCR matching, template matching, and machine learning).

Yet another aspect is directed to a method for operating a GUI testing device 201 in communication with a client computing device 202 configured to execute a software application 203 with an associated GUI 204. The method includes executing a testing state machine 205 for interacting with the software application 203 to generate an initial screen 206 of the GUI. The testing state machine 205 comprises a plurality of states 210*a*-210*n*. The method also includes determining a current state 211 in the testing state machine 205 based upon StartStateID 1104 as the initial state in the initial screen 206. The current state 211 comprises at least one operation 213*a*-213*n*. The testing state machine 205 includes at least one trigger 214*a*-214*n* in which SourceStateID 215 is current state. The at least one trigger 214*a*-214*n* includes a source state 215, a destination state 216, and a trigger target 217. The method comprises performing the at least one operation 213*a*-213*n* on the matching trigger target 212 in the initial screen 206 to generate a next screen of the GUI 204, and advancing from the current state 211 to a next state based upon the at least one trigger 214*a*-214*n*.

Diagram 1000 shows an architecture of the computing system 200. In this illustrated embodiment, the JSON test flow 1001 generates the testing state machine 205, which comprises a plurality of states 210*a*-210*b*, and a plurality of triggers 214*a*-214*n*. After the testing state machine 205 is generated, the matching trigger target (i.e. either trigger target 217 or the operation trigger target 212) is located in the initial screen 206, and is matched within a matching module 1003.

The matching module 1003 illustratively comprises a pre-trained model module 1007, an OCR service module 1009, and a template matching module 1011. The pre-trained model module 1007 is trained via a JSON annotation module 1005. Once the matching trigger target 217 has been matched to a given state using one or more of the pre-trained model module 1007, the OCR service module 1009, and the template matching module 1011, the SourceStateID 215 of the matched trigger is the current state 211. The accuracy of target locating is a core function of the matching module 1003. The ensemble of three types of target locating methods may provide for greater accuracy.

and an end state ID, and the plurality of states 210*a*-210*n*, and the plurality of triggers 214*a*-214*n*. Every state 210*a*-210*n* is mapped to a node of the testing state machine 205 in FIG. 7.

Each state 210*a*-210*n* includes a state ID to identify itself, and a plurality of operations 213*a*-213*n*. Each operation 213*a*-213*n* represents the action needed to go to the next state. Each operation 213*a*-213*n* may comprise a mouse operation (e.g., a move input, a right click, a left click, or a scroll input), a key input event, or a timer event, etc. If it is a mouse operation, it can include a matching trigger target, which is used to identify the graph element to operate on. The matching trigger target could be located through one of or combination of label, text or template matching method.

Every trigger 214*a*-214*n* is mapped to an edge of a state 210*a*-210*n* (node) of the testing state machine 205 in FIG. 7. Each trigger 214*a*-214*n* includes a source state ID to identify source state node of the testing state machine 205 and a destination state ID to identify destination state node of the testing state machine. The key object that each trigger 214*a*-214*n* has is a target, which defines the object to look for when deciding whether the current state can move to the next state. If the target is found in current screen shot, it means that the trigger is satisfied, the testing state machine 205 can take actions to move to the next state, which is identified in destination state ID.

The control 1103 has two main attributes. The first attribute is the start state ID, which represents a start state node of the testing state machine 205. The other attribute is the end state ID, which represents the end state node of the testing state machine 205.

Figure 9:
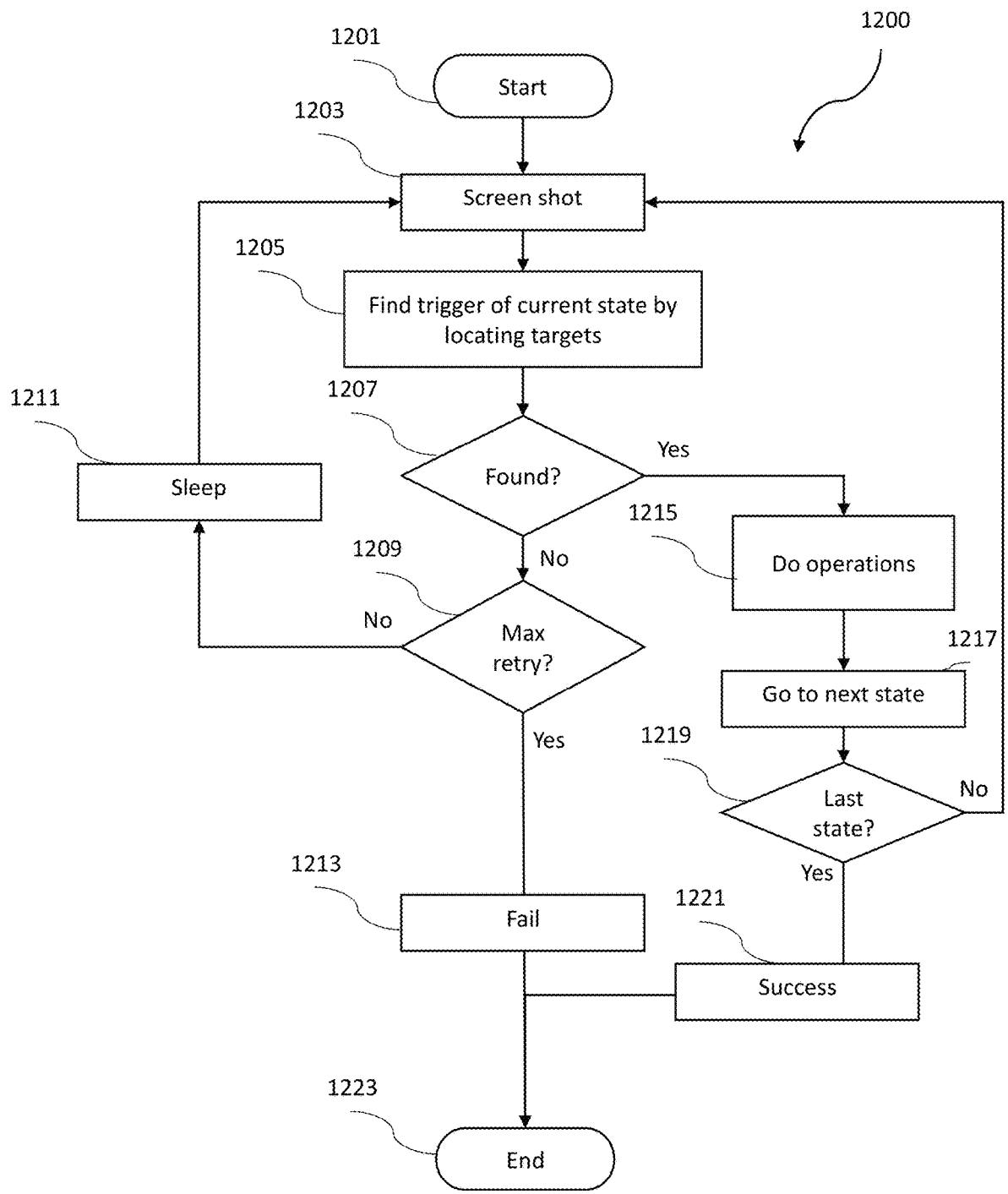
FIG. 9 is a flowchart of a method of operation within the example embodiment of the computing system of FIG. 6.

Referring now to FIG. 9 and Table 1 above, a flowchart 1200 showing a method for operation of the computing system 200 is now described, which begins at Block 1201. The method illustratively includes ingesting an initial screen 206 from the computing device 202 (Block 1203), and finding the trigger 214*a*-214*n* including a matching trigger

TABLE 1

| Terminology | Explanation |
| --- | --- |
| FSM | Finite State Machine |
| R-CNN | A class of Region Convolutional Neural Network such as: Faster R-CNN, RetinaNet, Yolo, etc. |
| Faster R-CNN | A model to solve object detection task in computer vision. |
| RetinaNet | A model to solve object detection task in computer vision. |
| Yolo | A model to solve object detection task in computer vision. |
| Pretrained Model | Model trained using deep learning technology in computer vision. The pretrained model accept a screen shot, return a label list and corresponding box list to identify a detected object. The model could be Faster-RCNN, RetinaNet, Yolo, etc. The model needs to be trained by the data set which include screenshot pictures and annotation file. |
| Annotation File | Used to training an R-CNN model. It marks label and box (position) of object (graph element) on the picture for training |
| Label | The category of the detected object in pretrained model. |
| Target | The graph element to look for in screen shot. It could be detected object in pretrained model, text box in OCR or object matched through image template. |
| Box | The position of the target. It is [x1, y1, x2, y2] list which is coordination of box in picture corresponding to (left, top, right, bottom). |
| SQDIFF | Calculates Square difference. An algorithm to calculate the similarity of the image |
| COEFF | Calculates Correlation Coefficients. An algorithm to calculate the similarity of the image |

Still referring to FIG. 8 along with Table 1 above, a diagram 1100 showing a test flow 1101 of the computing system 200 is now described. The test flow 1101 is driven by a control 1103, which includes a start state identifier (ID), target (i.e. trigger target 217) for a current state 211 (Blocks 1205, 1207). The method illustratively includes performing a respective operation 213*a*-213*n* on the matching trigger target in the initial screen 206 to generate a next screen of the GUI 204, and advancing from the current state 211 to a next state based upon the respective trigger 214a-214n (Blocks 1215, 1217).

If the matching trigger target 217 is not found after a maximum number of attempts, the method ends at Block 1223 (Blocks 1209, 1213). If the maximum number of attempts is not reached, the method includes entering a sleep mode for a set time period and taking another screen shot (Blocks 1211, 1203). The method also ends if the next state is the last state (Blocks 1219, 1221).

In the following, a more detailed description of the flowchart 1200 is provided. Firstly, the GUI testing device 201 loads the test flow file, maps it to internal structure, and executes it in the loop. The GUI testing device 201 executes at the start state, and captures a screen shot (Block 1203). The GUI testing device 201 obtains a list of all triggers from a state 210a-210n where the source state is the current state 211. The GUI testing device 201 traverses the trigger list, and gets the target object from the trigger. The target object in the trigger is used to decide whether the current state 211 can go to the next state. The target is found using one of or a combination of a label, text, or template matching method to locate itself in screen shot.

For label matching, the target has a label of the pre-trained model, and the GUI testing device 201 uses the pre-trained model to detect objects. The pre-trained model accepts screen shot, returns a label list and corresponding box list. The GUI testing device 201 searches the label list. If the target label is found, the GUI testing device 201 returns the box. The label matching feature can use the teachings disclosed herein.

The text matching means that the target can be located through specific text in screen shot. The text could be used to identify a button, a menu, or an icon, etc. The target text could be a wildcard string, or a regular expression. The GUI testing device 201 uses the OCR service (e.g., Google vision OCR, Microsoft Cognitive Services OCR, etc.) to detect text in screen shot. The OCR service returns text list and corresponding box list. The GUI testing device 201 searches the target text in text list. If the target text is found, the GUI testing device 201 returns the box. The text box needs to be merged if the target text cross multiple line. The text box merging disclosed herein can be used.

The template matching comprises when the target has a source template image, which could come from a local or remote storage, or label in annotated data set. The GUI testing device 201 uses this source template image to match the screen shot. If the template is matched, the GUI testing device 201 returns the box. All kinds of template matching algorithms in computer vision (e.g., SQDIFF, COEFF, etc.) could be applied. The target can combine three matching methods to locate itself in order to improve accuracy. If one method fails, the GUI testing device 201 will try the next method defined in the target.

If more than one target is found, other methods can be used to filter them. For example, the target value can be supplemented with "OrderDirection" and "OrderIndex" attributes within the testing state machine 205. The "OrderDirection" value means to sort the targets horizontal or vertical and get the index target defined in "OrderIndex" attribute. If the target is not found and the TRY COUNT does not amount to maximum retry number, the GUI testing device 201 enters a sleep mode because, for example, the system is busy and UI is changing (Blocks 1207, 1209, 1211). If the TRY COUNT amounts to maximum retry number, the GUI testing device 201 ends the execution and returns a fail result (Blocks 1207, 1209, 1213, 1223).

If the target is found, the GUI testing device 201 gets an operation list of current state and executes operations one by one (Blocks 1207, 1215). The operation could be a "MouseOperation", such as a move input, a click input, a double click input, or a scroll input. Some mouse operations need coordination of graph element, which may different with target in the trigger. Therefore, the "MouseOperation" can include the target. The GUI testing device 201 uses screen shot to find the target as described hereinabove and do mouse operations. The "KeyInputOperation" supports all kinds of key events, such as a character key, a key down, a key up, a functional key (e.g., ctrl, alt, shift), etc. The "TimerOperation" supports that the GUI testing device 201 sleep for a time number to wait some operations complete. Other operations such as multi-touch could also be supported.

After the operation is done, the testing state machine 205 switches state to next state according to destination state ID of the trigger. If the new state is not end state according to end state ID in the control 1103, the testing state machine 205 goes back to Block 1203. Otherwise, the GUI testing device 201 executes success and the testing state machine 205 ends execution (Blocks 1219, 1221, 1223).

Figure 10:
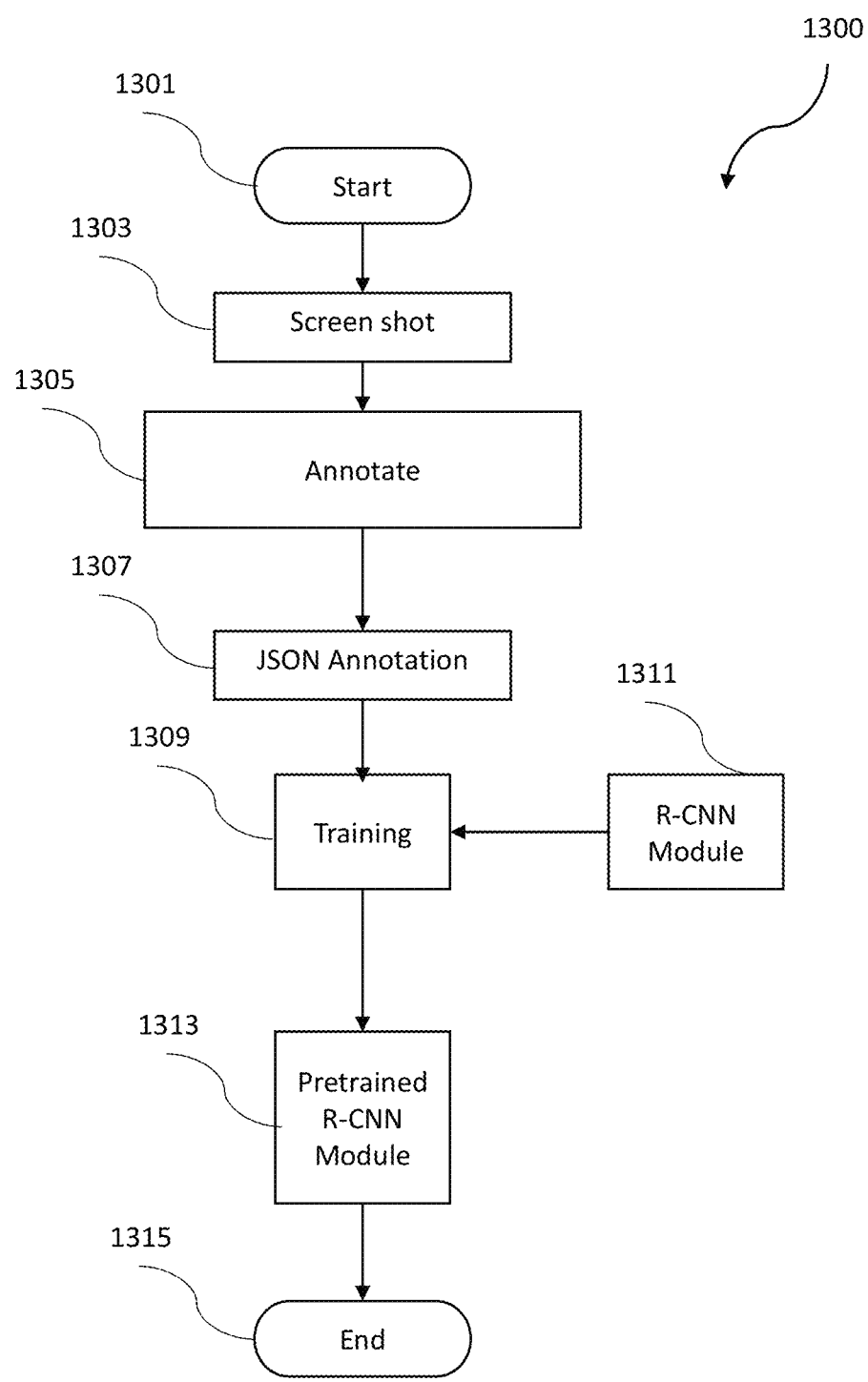
FIG. 10 is a flowchart of model training within the example embodiment of the computing system of FIG. 6.
Figure 11:
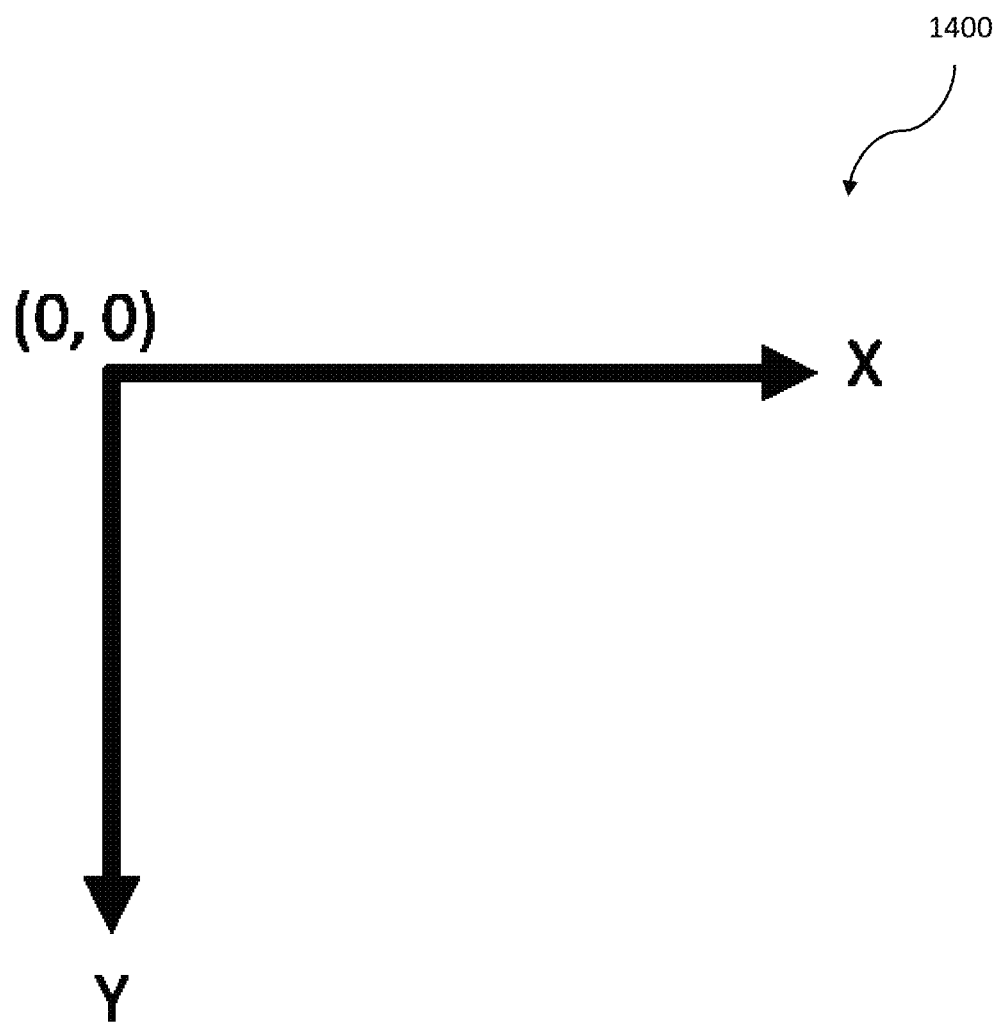
FIG. 11 is a schematic diagram of a coordinate system within the example embodiment of the computing system of FIG. 6.
Figure 12:
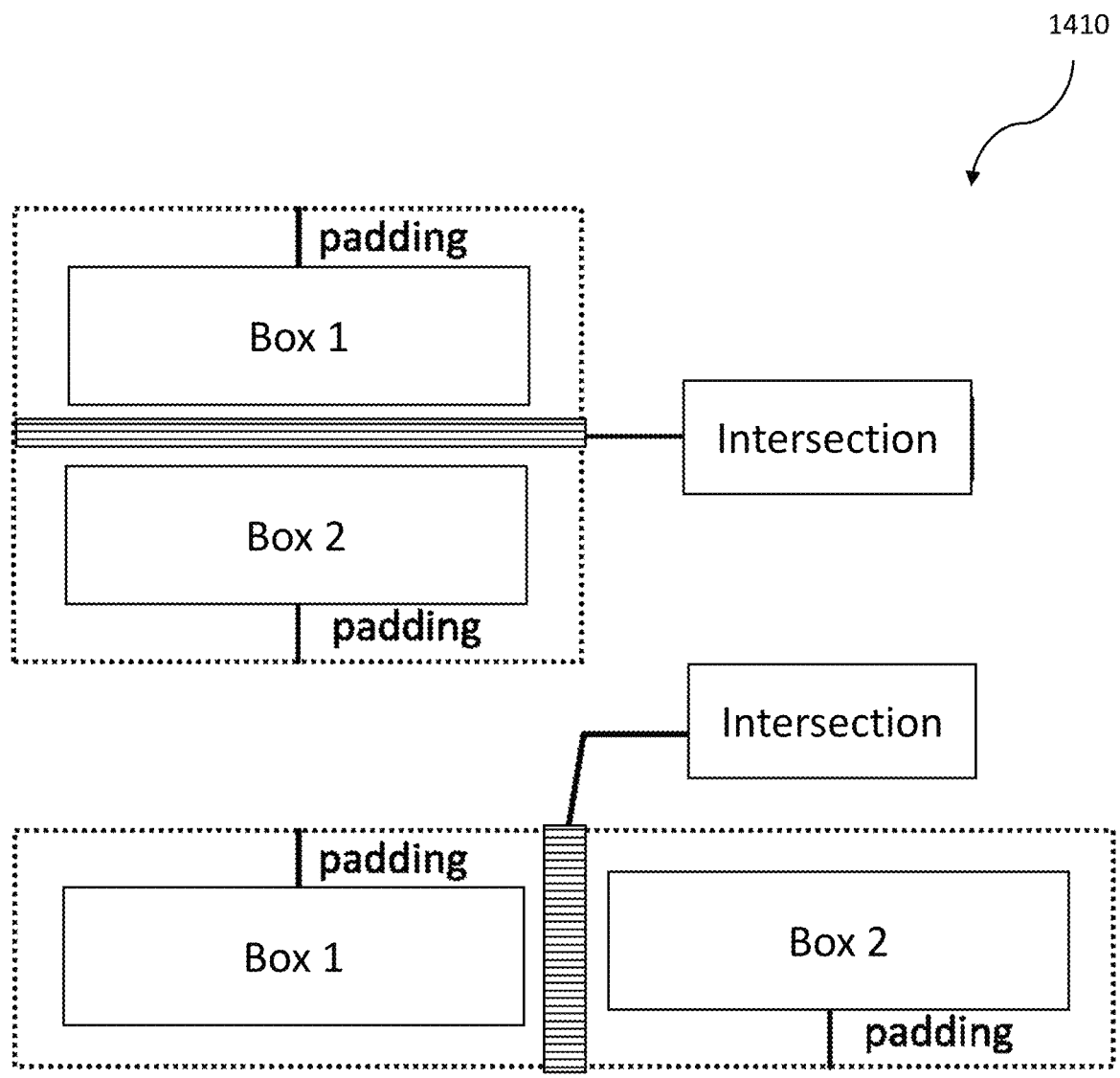
FIG. 12 is a schematic diagram of text box padding within the example embodiment of the computing system of FIG. 6.

Referring now to FIG. 10, a flowchart 1300 showing a method for model training in the computing system 200 is now described, which begins at Block 1301. The method illustratively includes ingesting a screen shot from the computing device 202 at each test step (Block 1303), and annotating the screen shot (Block 1305). In other words, the target is annotated for data set through annotation tools, such as VGG Image Annotator (VIA), Visual Object Tagging Tool (VoTT), etc., to generate annotation files.

The method includes creating a JSON annotation (Block 1307), and performing training from an R-CNN model (Blocks 1309, 1311). The method illustratively includes creating a pre-trained R-CNN module (Block 1313), and ends at Block 1315.

Advantageously, the computing system 200 provides an approach to the restriction of automation API requirements. The computing system 200 may make many manual tests automated. The computing system 200 can work on all kinds of OS platforms, such as: Windows, Linux, MAC, iOS, and Android, etc. Moreover, the user does not need to grasp complex programming skills. Their work transforms to generate test flow and annotation files.

In the following, a detailed discussion of a text box merging algorithm that can be used with the computing system 200 to locate GUI screen elements is provided.

With the development of graph recognition technology based on deep learning, UI automation can use this technology to detect a target, such as a button, an icon, or a text box, instead of using typical programing API, such as the UIAutomation API for Windows, Web DOM path API, etc. to get graph element. In UI automation based on graph recognition, the process typically needs to locate a target of the screenshot. One of the target types is text, and the process needs to know the position of the text box. Some OCR providers, such as Google Vision OCR service or Microsoft Recognition OCR service, can detect text and locate the box of the text. Normally, the user wants to find a search string, which may cross multiple lines in order to locate a specific target and avoid ambiguous results. For example, the user may define a wildcard search string, such as: "english*united*states*us*keyboard", to locate a target text box. There is a desire to find an efficient algorithm to merge the text box in order to match the search string.

The present disclosure includes a high-performance algorithm to merge the box based on a matrix computation library, such as: NumPy, TensorFlow, or PyTorch, etc., to avoid comparing every box position one by one in multiple loops. The input parameters of the algorithm comprise a lines parameter: a list of strings, which include text detected from OCR (size is N). The input parameters of the algorithm comprise a boxes parameter: a list of boxes corresponding to lines (it is N*4 two-dimension array), the column is box index, every row is coordination of box. The box is a [x1, y1, x2, y2] vector, which is a position of the box corresponding to (left, top, right, bottom).

The input parameters of the algorithm comprise a padding parameter: a scalar value. The padding pixels are defined to extend the box in order to produce an intersection with a neighboring box. The input parameters of the algorithm comprise: a maxWidth parameter, the maximum right boundary; a maxHeight parameter, the maximum bottom boundary; and a minSize parameter, such as (10, 10) tuple. The minSize[0] value is the minimum gap pixels between text boxes in horizontal direction if they are horizontal neighbors. The minSize[1] is the minimum gap pixels between text boxes in vertical direction if they are vertical neighbors. The parameter is used to judge whether two boxes are sorted in a vertical direction or in a horizontal direction. The vertical direction has a higher priority than the horizontal direction.

The output of the algorithm comprises: a mergedLines output: a list of strings after merge; and a mergedBoxes output: a list of merged boxes corresponding to mergedLines output. The algorithm uses matrix computation, which can be implemented in NumPy, TensorFlow or PyTorch matrix computation libraries, etc. The algorithm includes the following steps: assuming the left, top coordinate is (0, 0) and right, bottom coordinate is (maxWidth, maxHeight), as shown in diagram 1400 of FIG. 11; expanding boxes with padding as shown in diagram 1410 of FIG. 12; and computing an intersection between any two boxes [i, j] pair to get an intersection matrix.

Figure 13:
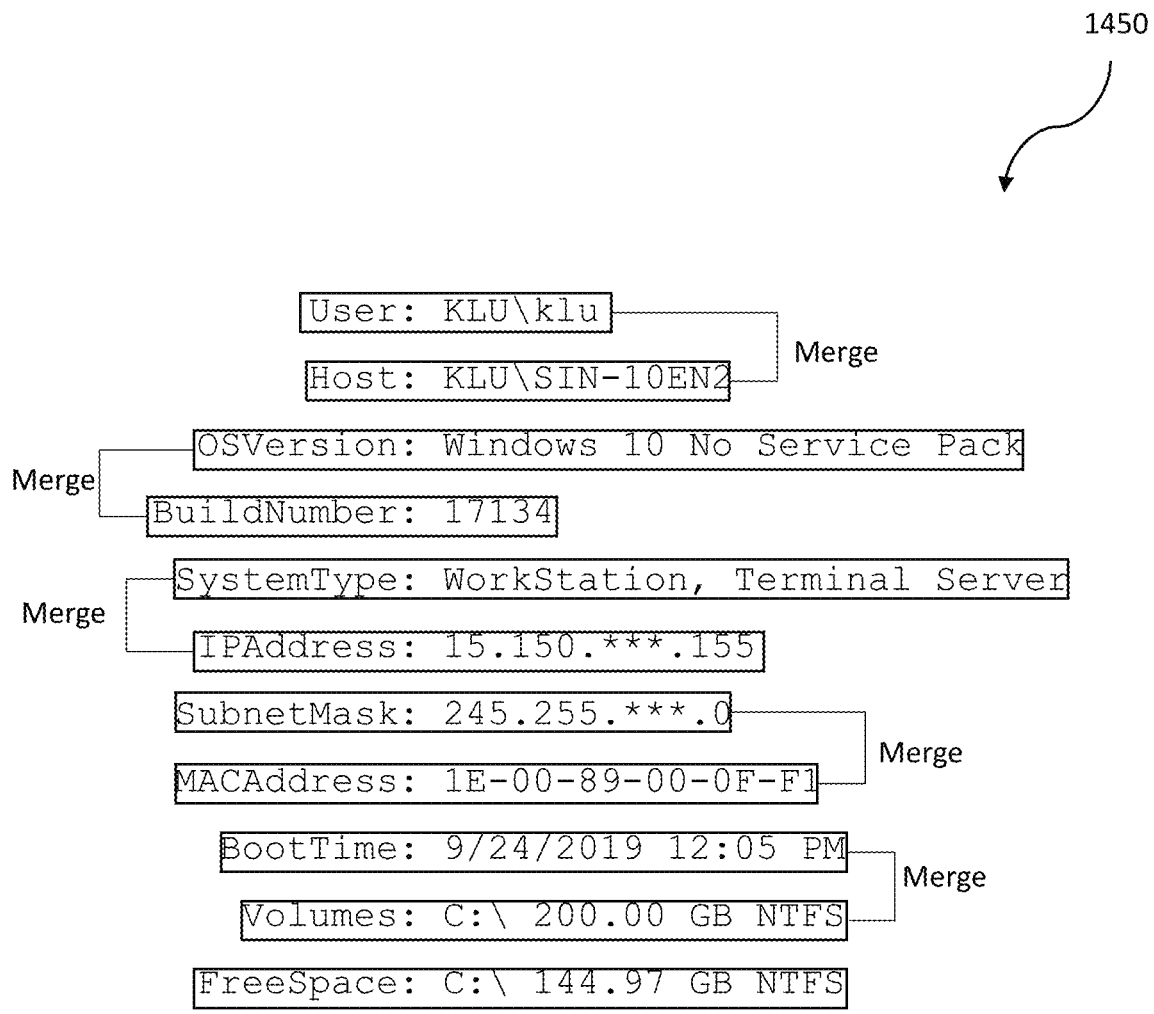
FIG. 13 is a schematic diagram of text box pairs within the example embodiment of the computing system of FIG. 6.

The steps include getting the [i, j] pairs from the intersection matrix where the intersection value >0; removing repeated indices in order to do two-box merging (any index can only appear once in box [i, j] pairs); and maintaining that every box can only appear once in box pairs. For example: if index 0 appears only once in the first dimension, it can't appear in the second dimension. Diagram 1450 of FIG. 13 is an example of the [i, j] box pairs.

Figure 14:
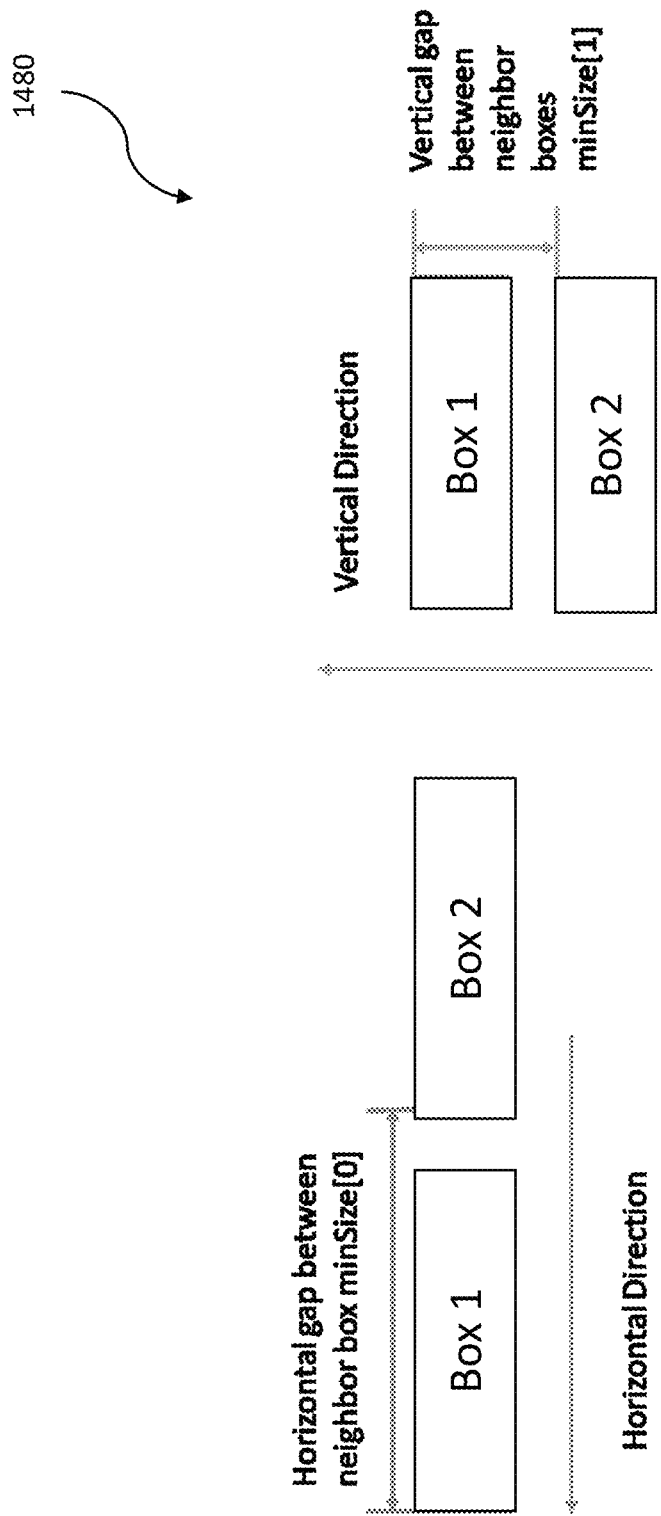
FIG. 14 is a schematic diagram of ordered text box pairs within the example embodiment of the computing system of FIG. 6.
Figure 15:
FIG. 15 is a schematic diagram of merged text box pairs from FIG. 13.

The steps include merging boxes according to an index [i, j] pair to generate a new box list; and sorting the box pair [i, j] in the vertical direction if a distance of the two boxes' top position is >minSize[1]. If for a box pair [i, j], boxes[i] is lower than boxes[j], then switch [i, j] pair. The steps include merging the corresponding line string of box pairs according to the order. Diagram 1480 of FIG. 14 is an example of ordered boxes.

The steps illustratively comprise sorting the box pair [i, j] left in a horizontal direction. If for a box pair [i, j], boxes[i] is more right than boxes[j], then switch [i, j] pair. The steps include merging the corresponding line strings of the box pair according to order; removing lines and boxes which have been merged to new lines and boxes; and repeating the above procedure until there are no boxes neighbored within padding, as shown in diagram 1490 of FIG. 15. The steps comprise matching a search string in new list of mergedLines. If found, the corresponding index of mergedBoxes is the position of the search string. The algorithm can predefine maxPadding value. If the search string is not found and the padding is less than maxPadding, increase padding value and continue from the first step until the search string is found or the padding is larger than maxPadding.

This algorithm regards a box list as a vector and operates on them using matrix computation to avoid box by box computation in multiple loops, which is used in typical scalar computation algorithms. Box merging does not only apply to UI automation (as discussed herein) but also applies to other applications, for example, merging recognized handwriting address in multiple lines in express delivery business, and merging the recognized road signs in multiple lines in autonomous car business, etc.

Figure 16:
FIG. 16 are images of computer vision tasks within the example embodiment of the computing system of FIG. 6.
Figure 16:
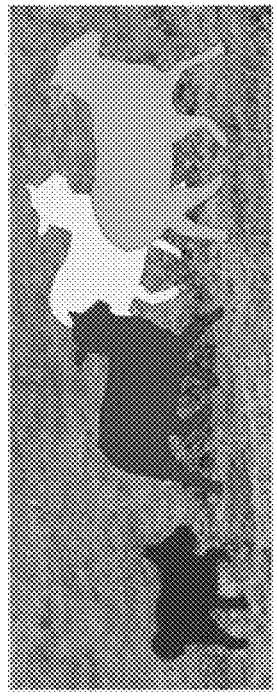
Figure 16:
Figure 16:
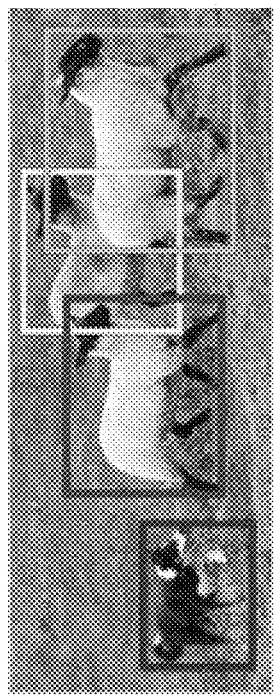

Object detection technology can be applied to detect a target of a screenshot in UI automation, for example, as shown in an image 1500 of FIG. 16. Several object detection models based on deep learning, such as faster R-CNN, or RetinaNet, Yolo, etc., have been included in approaches to complete this task. The typical approach comprises automation engineers training a model by annotating targets, which include (label, box) of the screenshot. Then, the automation engineers use this pre-trained model to detect targets of a new screenshot in UI automation.

Figure 20:
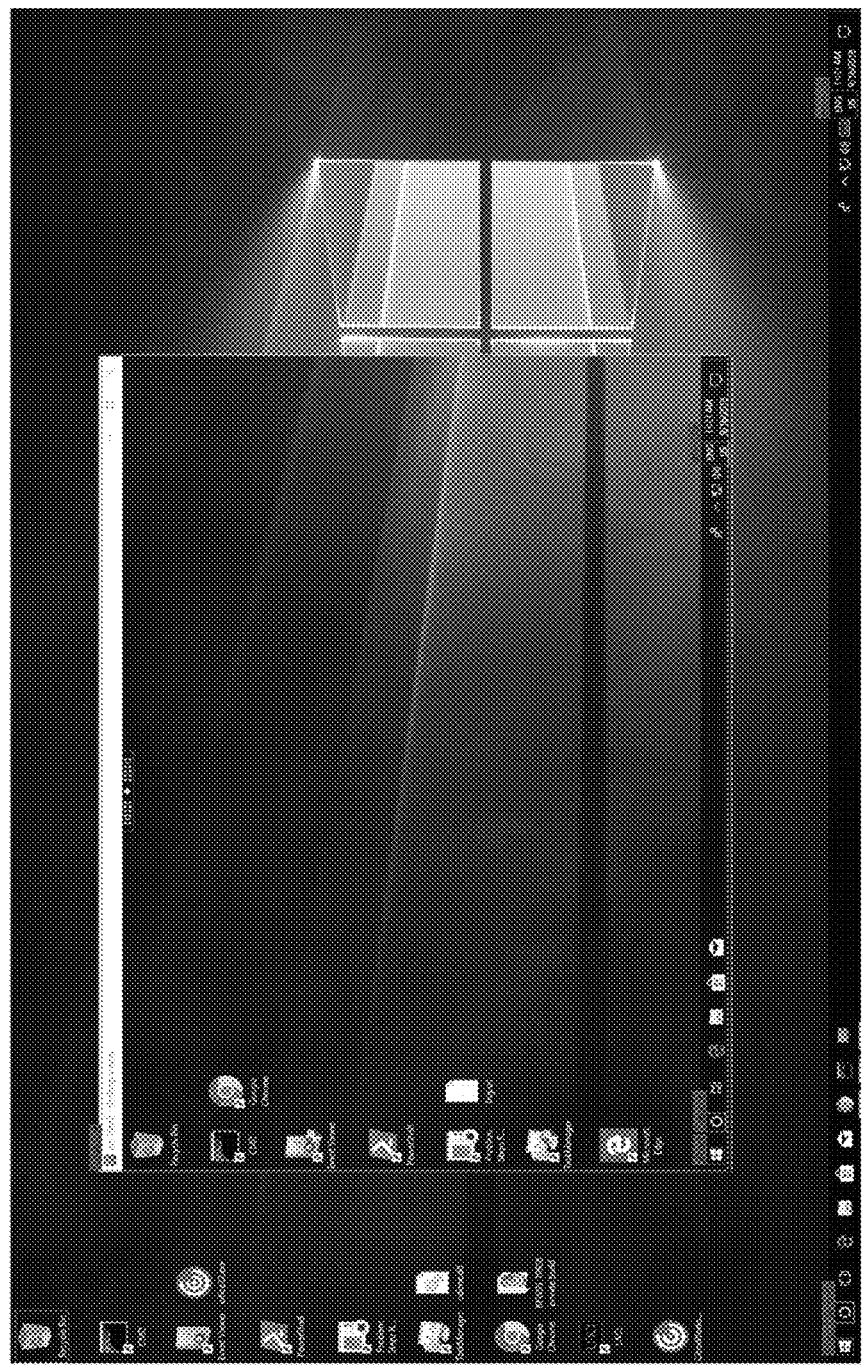
FIG. 20 is a screenshot of a target layout example within the example embodiment of the computing system of FIG. 6.

For example, as shown in diagram 1570 of FIG. 20, the pre-trained model detects: a windows.start icon, a windows-.search icon, a receiver.desktop window, and an english.keyboard indicator. The object is marked with a label and a box, which is the position of the detected object in picture. Normally, in some scenarios, it's not enough to locate a target if only an object and its position are known. For example, the user wants to click windows.search icon in receiver.desktop window, but there are two windows.search objects, which leads to the question of which one is the real target.

This present disclosure includes an algorithm of hierarchy label matching to locate a target precisely from more than one same shape graph elements. The algorithm builds the hierarchy structure information of objects, that is inclusion relationship between objects, such as between the object receiver.desktop and its contained object windows.search. After building this kind of inclusion relationship, in UI automation, set search target as label list, which represents the hierarchy relationship, such as [windows.search, receiver.desktop], to locate the specific windows.search target.

In order to describe the algorithm, the following data is used as an example. Assuming the picture coordinate left top is (0, 0) and right bottom is (max width, max height), as in diagram 1400 of FIG. 11. The pre-trained model has detected the following objects as input. Every box is a [x1, y1, x2, y2] vector, which is a position of box corresponding to (left, top, right, bottom).

boxes=[[2, 3, 1920, 1079], [6, 7, 512, 513], [600, 3, 1820, 981], [10, 11, 300, 301], [200, 101, 480, 481], [220, 151, 280, 281], [700, 100, 1520, 881], [800, 200, 1400, 781]]
labels=['0', '1', '2', '3', '4', '5', '6', '5']

Figure 17:
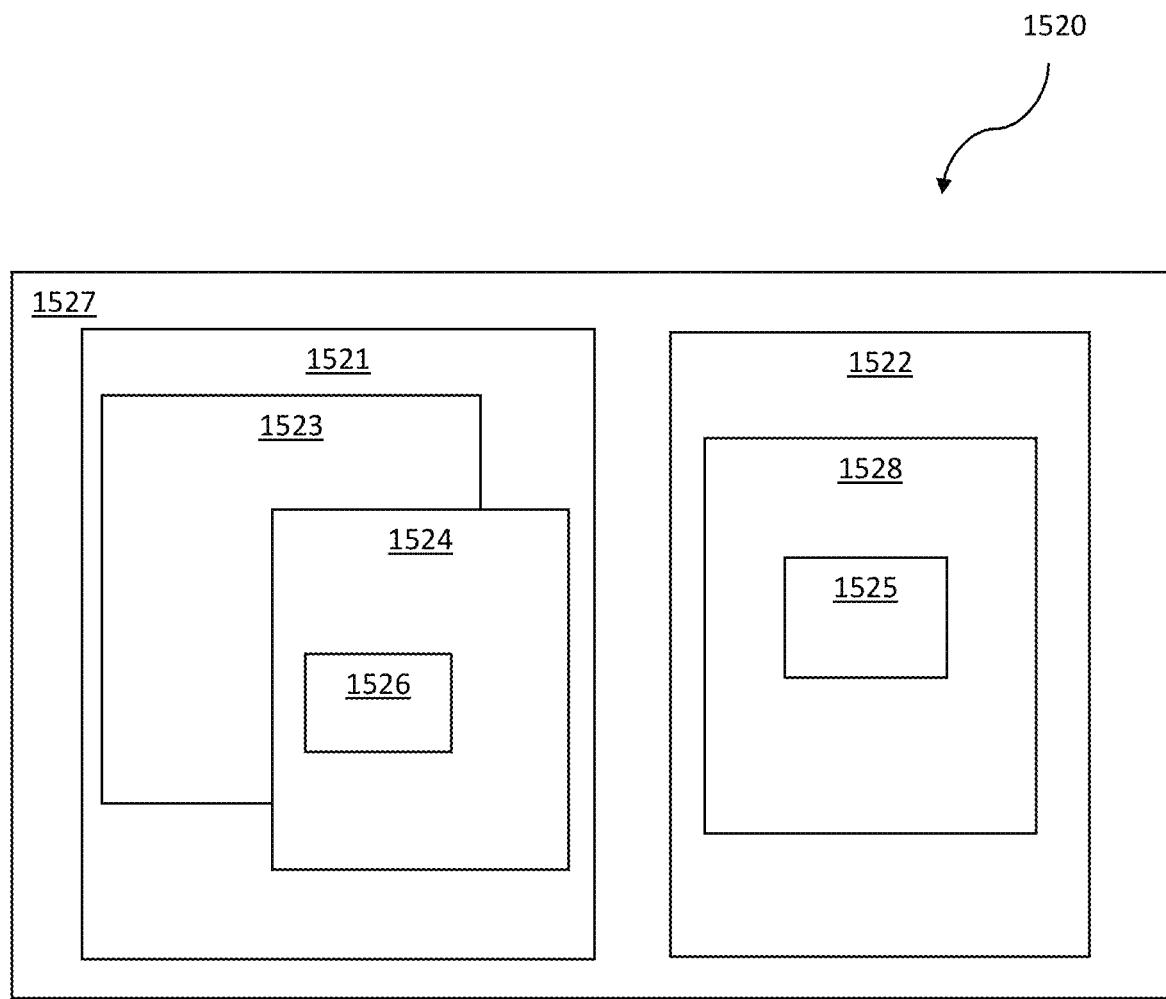
FIG. 17 is a schematic diagram of a target layout example within the example embodiment of the computing system of FIG. 6.
Figure 18:
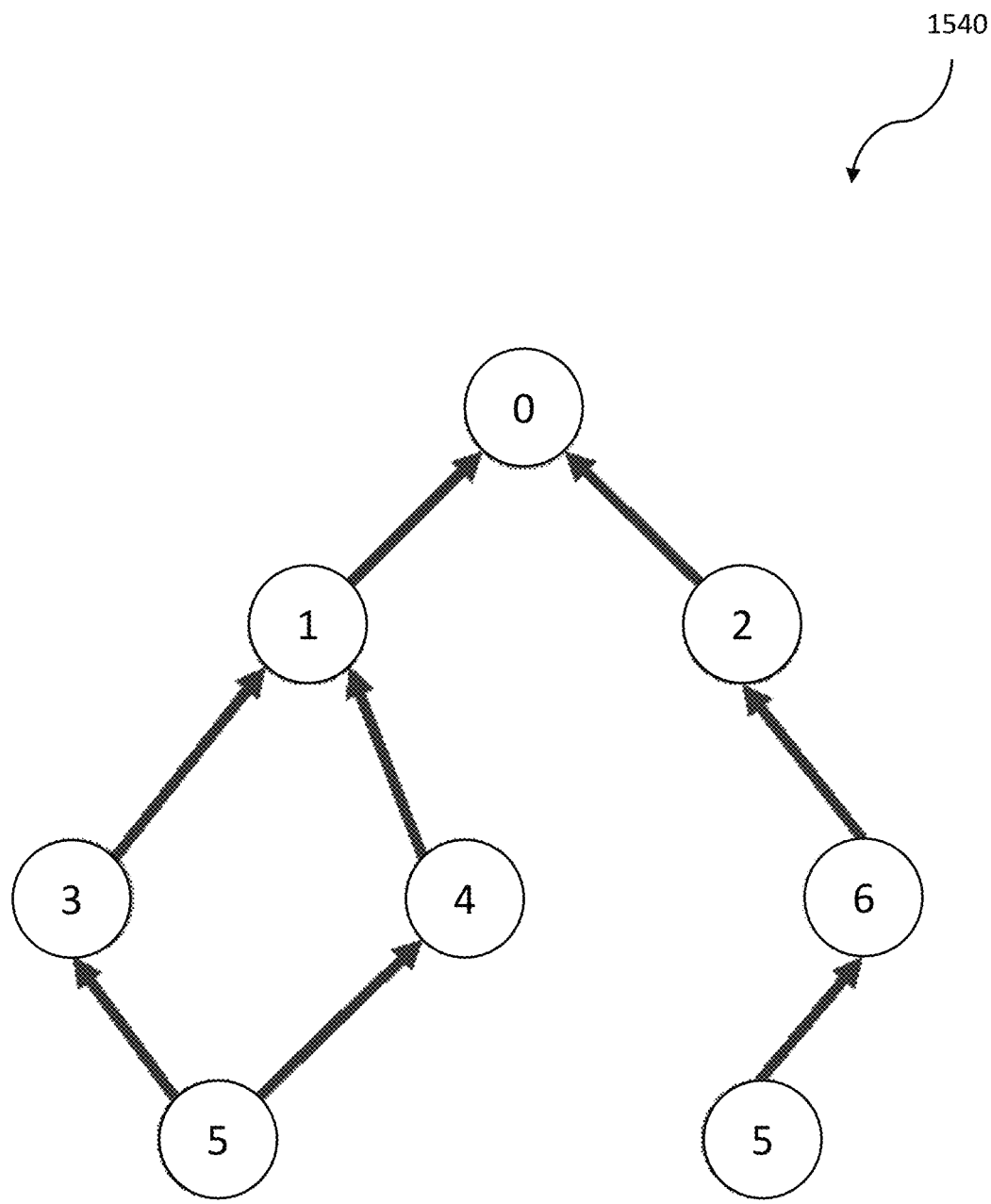
FIG. 18 is a schematic diagram of a hierarchy structure within the example embodiment of the computing system of FIG. 6.

The object layout according to boxes is as shown in diagram 1520 of FIG. 17. The object layout comprises: 0>>1527; 1>>1521; 2>>1522; 3>>1523; 4>>1524; 5>>1525, 1526; and 6>1528. The hierarchy structure is as shown in diagram 1540 of FIG. 18. The task is to locate target label '5', and the label hierarchy is ['5', '4', '1'], which is unique in detection results.

The algorithm includes the following steps: building inclusion relationships between two box pairs through matrix computation with high performance (so, there is no loop in programming to compare boxes). The building step comprises computing the intersection of two boxes to get N×N intersection matrix named inter. The inter[i, j] value is an intersection of boxes[i] and boxes[j]. If boxes[i] and boxes[j] have an intersection, inter[i, j]>0, else it's 0, and set the diagonal element inter[i, i] to 0.

The building step comprises computing every box area and expanding to an N×N matrix named area. Every row is an area of box list from boxes[0] to boxes[6]; and where ratio=inter/area, the building step includes getting the ratio of intersection in every box. Ratio[i, j] is the value between 0 and 1.0. For example, if ratio[i, j]>0.95, it means that the area of intersection is almost equal to boxes[j], so boxes[i] contains boxes[j]. The following is a result of an example.
[[0.0000, 1.0000, 1.0000, 1.0000, 1.0000, 1.0000, 1.0000, 1.0000],
[0.1244, 0.0000, 0.0000, 1.0000, 1.0000, 1.0000, 0.0000, 0.0000],
[0.5784, 0.0000, 0.0000, 0.0000, 0.0000, 0.0000, 1.0000, 1.0000],
[0.0410, 0.3294, 0.0000, 0.0000, 0.1896, 1.0000, 0.0000, 0.0000],
[0.0518, 0.4165, 0.0000, 0.2397, 0.0000, 1.0000, 0.0000, 0.0000],
[0.0039, 0.0311, 0.0000, 0.0944, 0.0746, 0.0000, 0.0000, 0.0000],
[0.3106, 0.0000, 0.5371, 0.0000, 0.0000, 0.0000, 0.0000, 1.0000],
[0.1692, 0.0000, 0.2926, 0.0000, 0.0000, 0.0000, 0.5448, 0.0000]]

The building step includes getting the box index pair [i, j]. When the ratio is >ratio_threshold, ratio_threshold is a scalar and normally larger than 0.95, which means the area is between intersection and boxes[j]. The box index pair [i, j] means that boxes[i] contains boxes[j]. So, the process obtains the box index pair list box_inclusion_inds.

Figure 19:
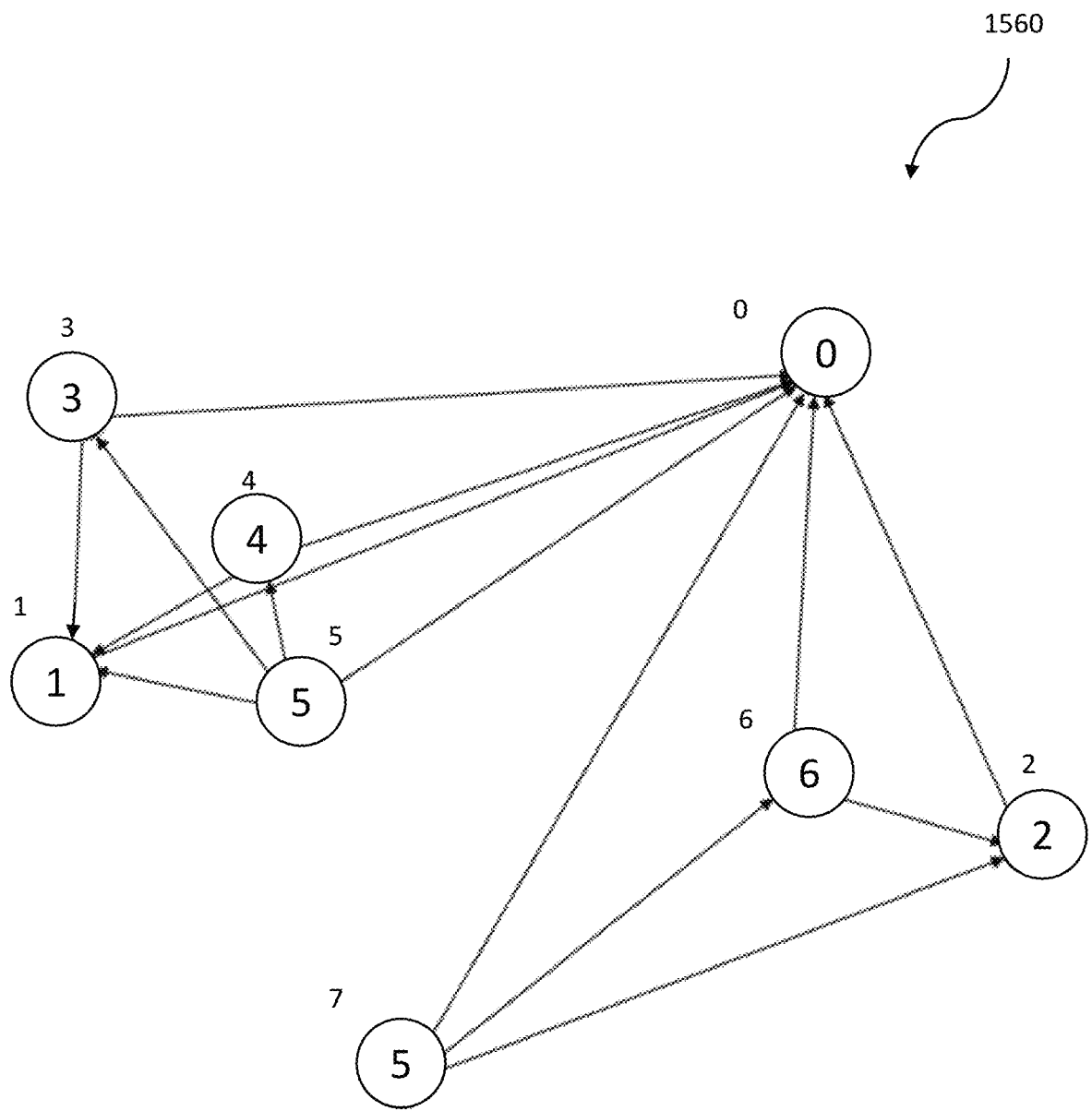
FIG. 19 is a direct graph diagram within the example embodiment of the computing system of FIG. 6.

The algorithm includes building the directed graph according box_inclusion_inds. Pair [i, j] is a directed edge from boxes[j] to boxes[i], and i and j are nodes to add to the graph. Diagram 1560 of FIG. 19 is the result of the example. The number inside the circle is the label of box, and the number outside the circle is the index of box, which is also node identifier.

The algorithm includes the step of building a search node pair list according to a first label and a last label in search hierarchy target label list. For example, in hierarchy target label list ['5', '4', '1'], the first label is '5'. The node identifier in graph has [5, 7] two nodes. And the last label is '1', and the node identifier in graph has [1] one node. The search node pair lists would be [5, 1], [7, 1], two pairs.

The algorithm includes the steps of getting all node paths for every search [source, destination] node pair. For example, for search node pair [5, 1], get [5, 1], [5, 4, 1] and [5, 3, 1] (three paths). For search node pair [7, 1], there is no path. The algorithm includes the step of creating label paths according to node paths. So, three node paths [5, 1], [5, 4, 1] and [5, 3, 1] correspond to ['5','1'], ['5','4','1'] and ['5','3','1'] three label paths.

The algorithm includes the step of matching the hierarchy target label list in found label paths. If found, the match is a success and return a source node identifier, which is the target box index. The algorithm returns the target box and label, otherwise, the algorithm returns an empty target box and label.

The present description is made with reference to the accompanying drawings, in which example embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and base 100 reference numerals are used to indicate similar elements in alternative embodiments.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

The invention claimed is:

1. A computing system comprising:
a graphical user interface (GUI) testing device in communication with a computing device configured to execute a software application with an associated GUI, the GUI testing device configured to
execute a testing state machine for interacting with the software application to generate an initial screen of the GUI, the testing state machine comprising a plurality of states,
determine a current state in the testing state machine based upon a matching trigger target in the initial screen to a given state, the current state comprising at least one operation, and at least one trigger associated with the at least one operation, the at least one trigger including a source state, a destination state, and a trigger target, the at least one operation comprising a user input operation, and an operation trigger target,
the determining of the current state comprising
applying a convolutional neural network (CNN) to generate a plurality of labels, and
finding the trigger including the matching trigger target in the plurality of labels, the matching trigger including a source state being the current state, and
perform the at least one operation on the matching trigger target in the initial screen to generate a next screen of the GUI, and advance from the current state to a next state based upon the at least one trigger.

2. The computing system of claim 1 wherein the GUI testing device is configured to determine a plurality of GUI elements in the initial screen; and wherein the matching trigger target comprises a matching target GUI element from the plurality of GUI elements.

3. The computing system of claim 1 wherein the GUI testing device is configured to determine the current state in the testing state machine by at least:
determining and applying a matching image template with the initial screen; and
finding the trigger including the matching trigger target in the matching image template, the matching trigger including a source state being the current state.

4. The computing system of claim 1 wherein the GUI testing device is configured to perform the at least one operation on the trigger target in a current screen to generate another screen of the GUI.

5. The computing system of claim 1 wherein the at least one operation comprises a plurality thereof; wherein the trigger target comprises a plurality thereof associated with the plurality of operations; and wherein the GUI testing device is configured to iteratively perform each operation on the trigger target to generate a plurality of next screens of the GUI.

6. The computing system of claim 1 wherein the user input operation comprises at least one of a keyboard input and a mouse input.

7. The computing system of claim 1 wherein the GUI testing device is configured to execute the testing state machine based upon a JavaScript Object Notation (JSON) file.

8. The computing system of claim 1 wherein the convolutional neural network comprises a pre-trained CNN.

9. The computing system of claim 1 wherein the GUI testing device is configured to train the CNN based upon a screenshot of the GUI, and an annotation file associated with the screenshot of the GUI.

10. The computing system of claim 1 wherein the determining of the current state comprises applying the CNN to generate a plurality of boxes associated with the plurality of labels, and a plurality of locations for the plurality of boxes.

11. A method for operating a graphical user interface (GUI) testing device in communication with a computing device configured to execute a software application with an associated GUI, the method comprising:
executing a testing state machine for interacting with the software application to generate an initial screen of the GUI, the testing state machine comprising a plurality of states;
determining a current state in the testing state machine based upon a matching trigger target in the initial screen to a given state, the current state comprising at least one operation, and at least one trigger target associated with the at least one operation, the at least one trigger including a source state, a destination state, and a trigger target, the at least one operation comprising a user input operation, and an operation trigger target, the determining comprising
applying a convolutional neural network (CNN) to generate a plurality of labels, and
finding the trigger including the matching trigger target in the plurality of labels, the matching trigger including a source state being the current state; and
performing the at least one operation on the matching trigger target in the initial screen to generate a next screen of the GUI, and advancing from the current state to a next state based upon the at least one trigger.

12. The method of claim 11 further comprising determining a plurality of GUI elements in the initial screen; and wherein the matching trigger target comprises a matching target GUI element from the plurality of GUI elements.

13. The method of claim 11 wherein determining the current state in the testing state machine comprises: determining and applying a matching image template with the initial screen; and finding the trigger including the matching trigger target in the matching image template, the matching trigger target including a source state being the current state.

14. The method of claim 11 further comprising performing the at least one operation on the trigger target in a current screen to generate another screen of the GUI.

15. The method of claim 11 wherein the at least one operation comprises a plurality thereof; wherein the trigger target comprises a plurality thereof associated with the plurality of operations; and further comprising iteratively performing each operation on the trigger target to generate a plurality of next screens of the GUI.

16. The method of claim 11 wherein the user input operation comprises at least one of a keyboard input and a mouse input.

17. The method of claim 11 further comprising merging a plurality of text boxes in the initial screen of the GUI.

18. The method of claim 11 wherein the convolutional neural network comprises a pre-trained CNN.

19. The method of claim 11 further comprising training the CNN based upon a screenshot of the GUI, and an annotation file associated with the screenshot of the GUI.

20. The method of claim 11 wherein the determining comprises applying the CNN to a plurality of boxes associated with the plurality of labels, and a plurality of locations for the plurality of boxes.

* * * * *